United States Patent
Peyla et al.

(10) Patent No.: US 7,982,683 B2
(45) Date of Patent: Jul. 19, 2011

(54) ANTENNA DESIGN FOR FM RADIO RECEIVERS

(75) Inventors: Paul J. Peyla, Elkridge, MD (US); Brian William Kroeger, Sykesville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 820 days.

(21) Appl. No.: 11/861,479

(22) Filed: Sep. 26, 2007

(65) Prior Publication Data
US 2009/0079656 A1    Mar. 26, 2009

(51) Int. Cl.
    H01Q 1/50    (2006.01)
(52) U.S. Cl. .......................... 343/860; 343/853
(58) Field of Classification Search .............. 343/702, 343/860, 861, 853; 375/267
    See application file for complete search history.

(56) References Cited

U.S. PATENT DOCUMENTS

| | | | |
|---|---|---|---|
| 4,730,195 A | 3/1988 | Phillips et al. | |
| 5,751,253 A | 5/1998 | Wells | |
| 5,771,441 A * | 6/1998 | Altstatt | 455/66.1 |
| 6,177,911 B1 | 1/2001 | Yuda et al. | |
| 6,239,768 B1 | 5/2001 | Oh et al. | |
| 6,539,063 B1 * | 3/2003 | Peyla et al. | 375/267 |
| 6,891,898 B2 * | 5/2005 | Peyla et al. | 375/267 |
| 6,963,313 B2 | 11/2005 | Du | |
| 2002/0186171 A1 * | 12/2002 | Petros | 343/725 |
| 2005/0215214 A1 * | 9/2005 | Moorti et al. | 455/193.1 |
| 2006/0166719 A1 | 7/2006 | Arad et al. | |
| 2006/0209941 A1 | 9/2006 | Kroeger | |
| 2008/0068271 A1 * | 3/2008 | Iwai et al. | 343/702 |

FOREIGN PATENT DOCUMENTS

| | | |
|---|---|---|
| EP | 1605545 A1 | 12/2005 |
| EP | 1624586 A1 | 2/2006 |
| EP | 1855351 A1 | 11/2007 |
| WO | WO2006092913 A1 | 9/2006 |

OTHER PUBLICATIONS

International Search Report, PCT/US2008-077635, Nov. 17, 2008.
U.S. Appl. No. 11/757,574, filed Jun. 4, 2007, Peyla et al.
National Radio Systems Committee, NRSC-5-A, In-band/on-channel Digital Radio Broadcasting Standard, Sep. 2005, 42 pgs.

* cited by examiner

*Primary Examiner* — HoangAnh T Le
(74) *Attorney, Agent, or Firm* — Robert P. Lenart, Esq.; Pietragallo Gordon Alfano Bosick & Raspanti, LLP

(57) ABSTRACT

An apparatus includes first and second speakers, and an antenna including a first pair of wires connected to the first speaker, a second pair of wires connected to the second speaker, and a conductive sleeve surrounding portions of the first and second pairs of wires, the sleeve forming a coaxial capacitor with the first and second pairs of wires. The apparatus can further include an inductor connected between the first and second pairs of wires and the sleeve, to form a resonant circuit with the coaxial capacitor.

32 Claims, 26 Drawing Sheets

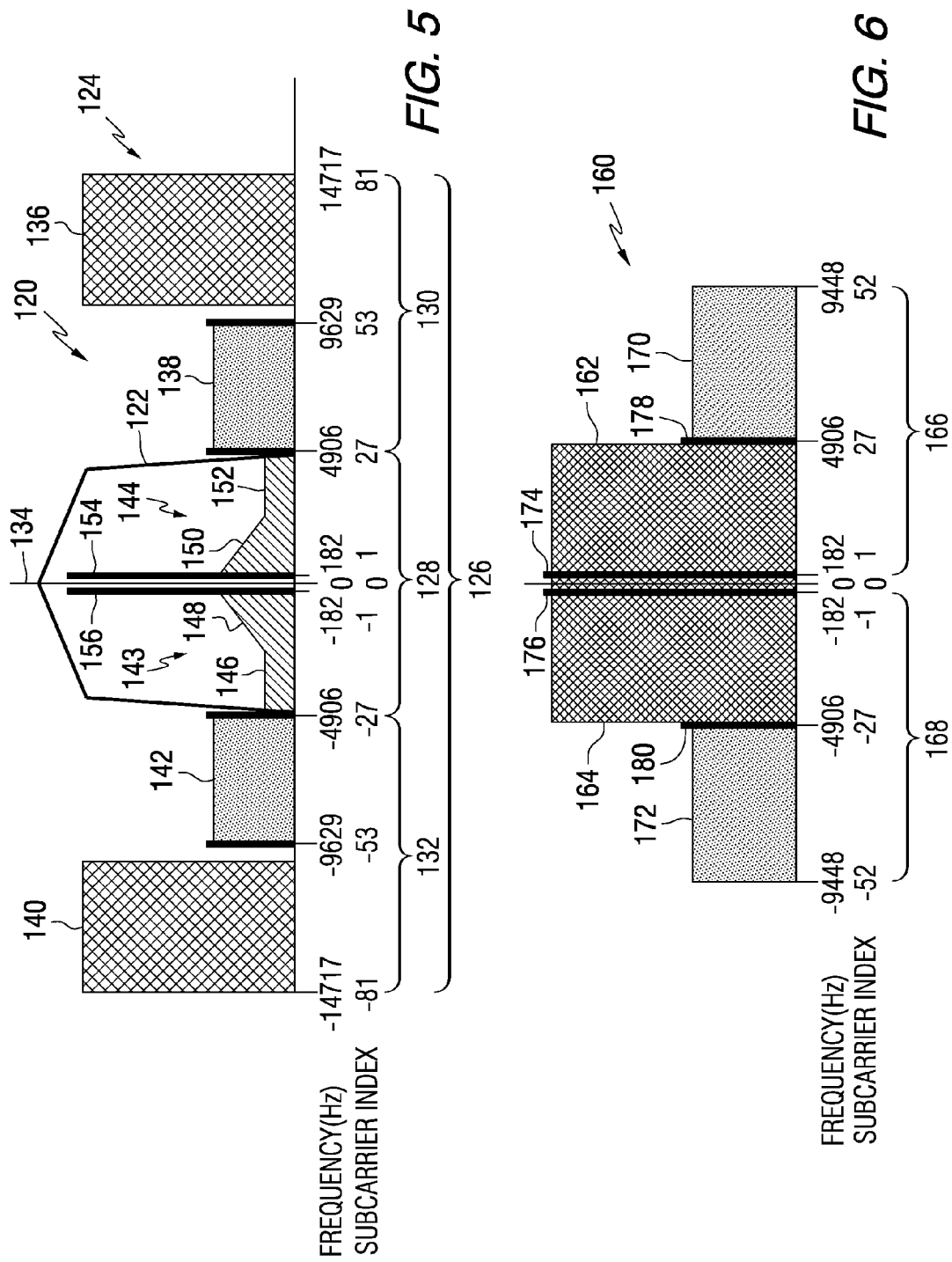

ANTENNA DESIGN FOR FM RADIO RECEIVERS

FIELD OF THE INVENTION

This invention relates to an antenna for receiving FM analog and digital radio broadcast signals, and more particularly to methods and apparatus for implementing in a portable digital radio receiver an antenna for receiving a digital radio broadcast signal.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several programs or data streams over one channel in the AM or FM spectrum, enables stations to broadcast multiple streams of data on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio™ technology is an implementation of the NRSC-5A IBOC standard. Further information regarding HD Radio™ technology can be found at www.hdradio.com and www.ibiquity.com.

Other types of digital radio broadcasting systems include satellite systems such as XM Radio, Sirius and WorldSpace, and terrestrial systems such as Digital Radio Mondiale (DRM), Eureka 147 (branded as DAB), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

It would be desirable to have a portable or hand-held FM digital radio receiver device. However, existing FM analog portable and hand-held radio receiver devices typically have very poor reception. These devices present several challenges, including small size and weight, EMI caused by antenna proximity to electronics, variability due to the effects of the human body, and the need to support indoor reception. Currently, portable and hand-held analog radio receivers may use an earbud-wire type antenna, which may be either a dipole or monopole. An earbud dipole antenna solution yields poor performance due to the limited distance between the ears for the upper and lower elements of the antenna, whereas a monopole earbud antenna solution requires the addition of a ground plane to replace the lower-half element of a dipole. Ideally, the ground plane is approximately a quarter wavelength in size. However, today's hand-held devices are typically much smaller. One way to improve a ground plane is to include a meander (spiral) loop. Such a loop increases the effective ground plane size and the inductance of the spiral reduces high capacitive reactance. The meander-loop type antenna is presently found in cell phones and in some table-top radio receivers, but not in portable radio devices. A better approach would be to use antenna elements that do not require a ground plane. The quality of reception for both monopole and dipole earbud antennas is variable and unpredictable, depending significantly on the orientation of the user and the antenna elements. Movement or touching of the antenna or receiver by the user can change the quality of the signal, which the human body itself can attenuate. Moreover, EMI between the antenna and nearby electronic elements such as the power supply can contribute to loss in performance. In addition, these antennas have unbalanced impedance. The impedance is orientation-dependant and impedance matching to the receiver is lossy. To overcome these problems, one existing solution is to include the antenna in a docking station for the hand-held receiver. This solution is undesirable, however, because the antenna element is not portable and cannot travel with the user. It would be desirable to have an antenna design that overcomes these and other problems, particularly for use with a portable hand-held receiver for receiving analog and digital radio broadcast signals.

SUMMARY OF THE INVENTION

In a first aspect, the invention provides an apparatus including first and second speakers, and an antenna including a first pair of wires connected to the first speaker, a second pair of wires connected to the second speaker, and a conductive sleeve surrounding portions of the first and second pairs of wires, the sleeve forming a coaxial capacitor with the first and second pairs of wires.

In a second aspect, the invention provides a method for receiving a radio signal. The method includes the steps of: receiving the radio signal on at least one of a first antenna and a second antenna, calculating a first quality metric for the received radio signal, calculating a second quality metric for the received radio signal, selecting the first antenna, the second antenna or a combination of the first and second antennas to receive the radio signal, based on the first and second quality metrics, and tuning an impedance of the selected antenna to match the impedance of a receiver.

In a third aspect, the invention provides an apparatus for receiving a radio signal. The apparatus includes a first antenna, a second antenna, a processor for calculating a first quality metric for the received radio signal and for calculating a second quality metric for the received radio signal, an antenna selector for selecting the first antenna, the second antenna or a combination of the first and second antennas to receive the radio signal, based on the first and second quality metrics, and an impedance matching circuit for tuning an impedance of the selected antenna to match the impedance of a receiver.

In a fourth aspect, the invention provides a method for detecting the quality of an analog radio signal. The method includes the steps of: receiving a radio signal including a pilot signal, estimating signal-to-noise ratio of a portion of the radio signal in a predetermined frequency range around the pilot signal frequency, and transforming the signal-to-noise ratio to form an analog signal quality metric.

BRIEF DESCRIPTION OF THE DRAWINGS

FIG. 5 is a schematic representation of a hybrid AM IBOC DAB waveform.

FIG. 6 is a schematic representation of an all-digital AM IBOC DAB waveform.

DETAILED DESCRIPTION OF THE INVENTION

FIGS. 1-11 and the accompanying description herein provide a general description of an IBOC system, including broadcasting equipment structure and operation, receiver structure and operation, and the structure of IBOC DAB waveforms. FIGS. 12-16 and 29 and the accompanying description herein provide a detailed description of antenna designs according to aspects of the present invention. FIGS. 17-28 and the accompanying description herein provide a detailed description of the structure and operation of antenna element diversity and adaptive impedance matching algorithms according to aspects of the present invention.

IBOC System and Waveforms

Figure 1:
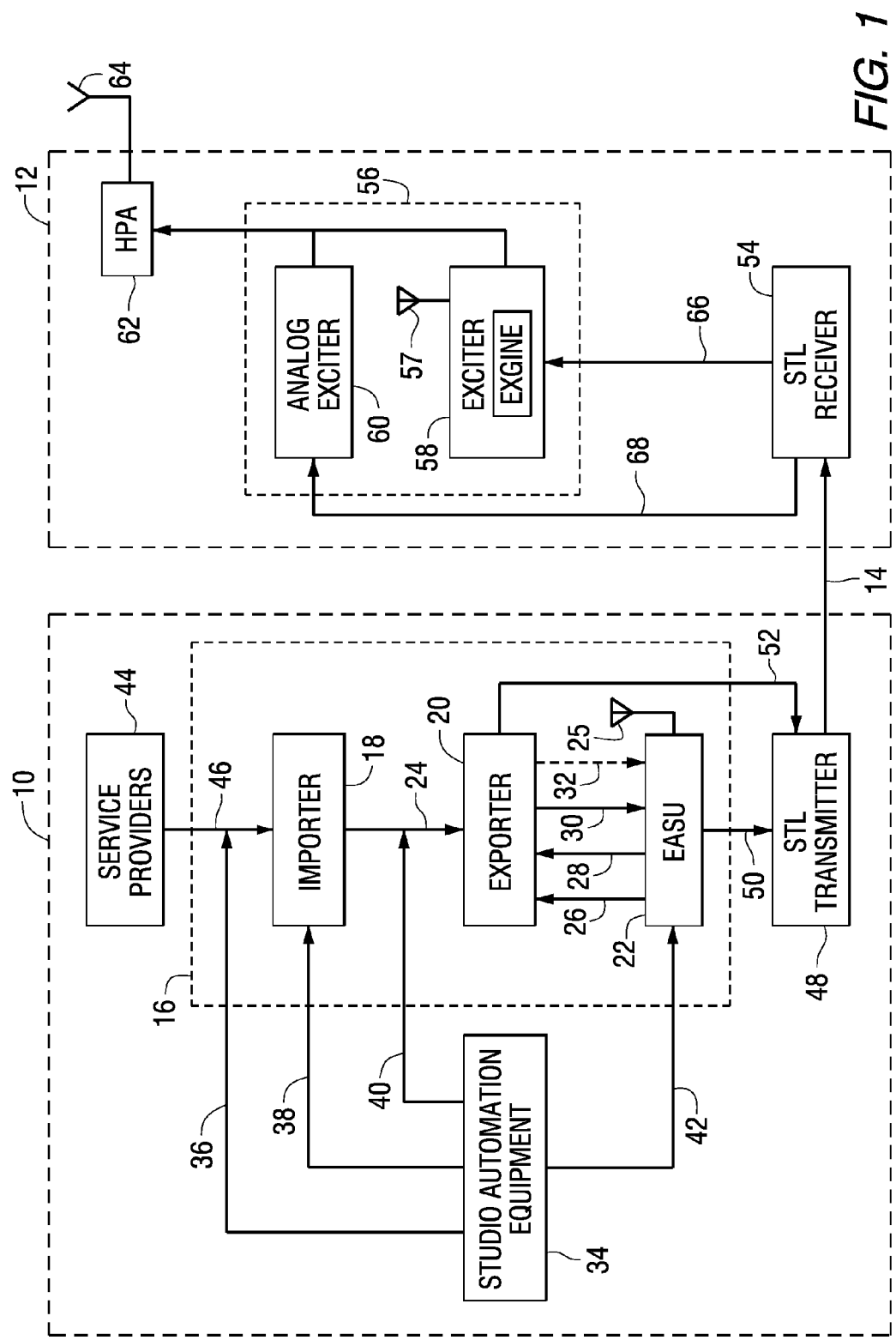
FIG. 1 is a block diagram of a transmitter for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
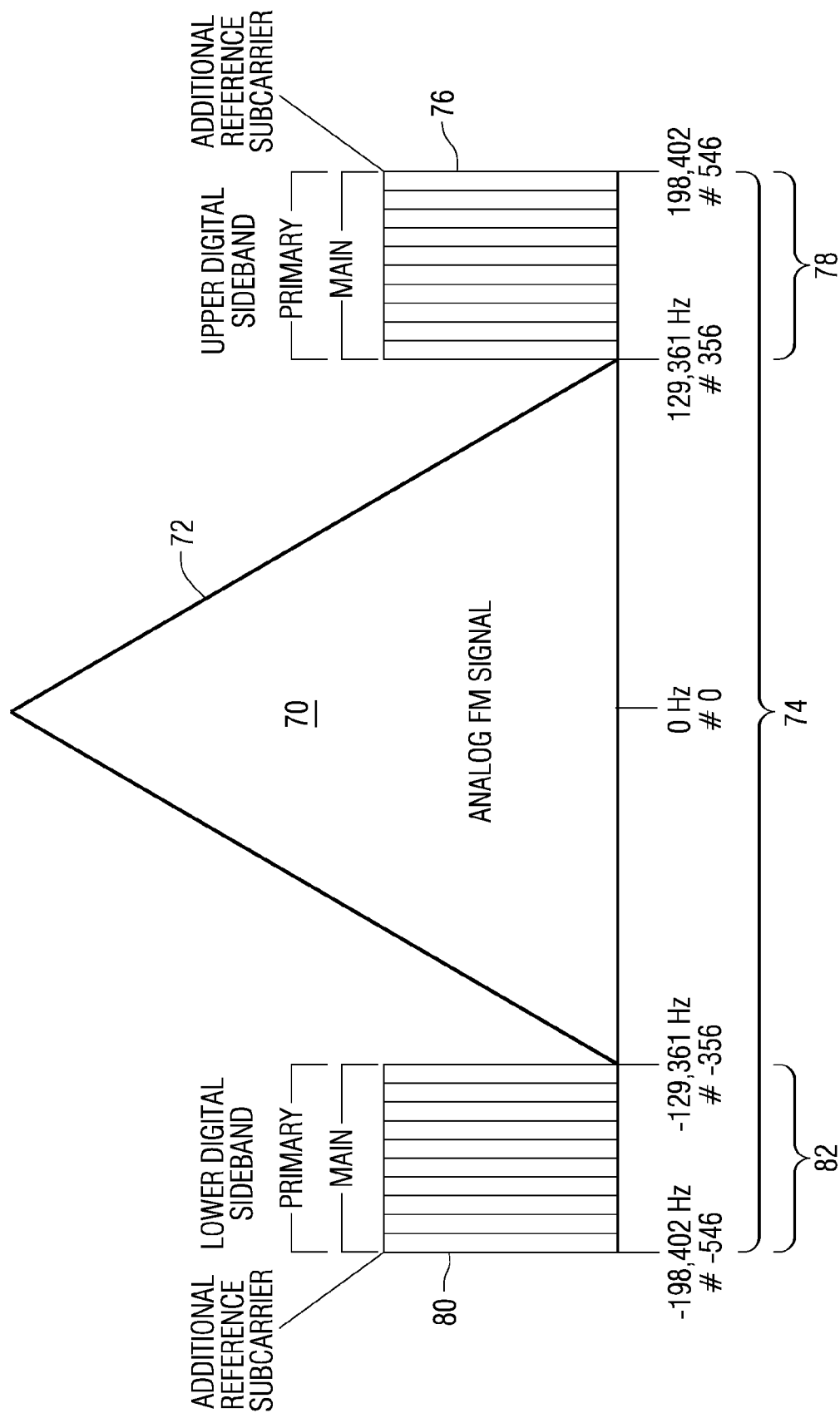
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
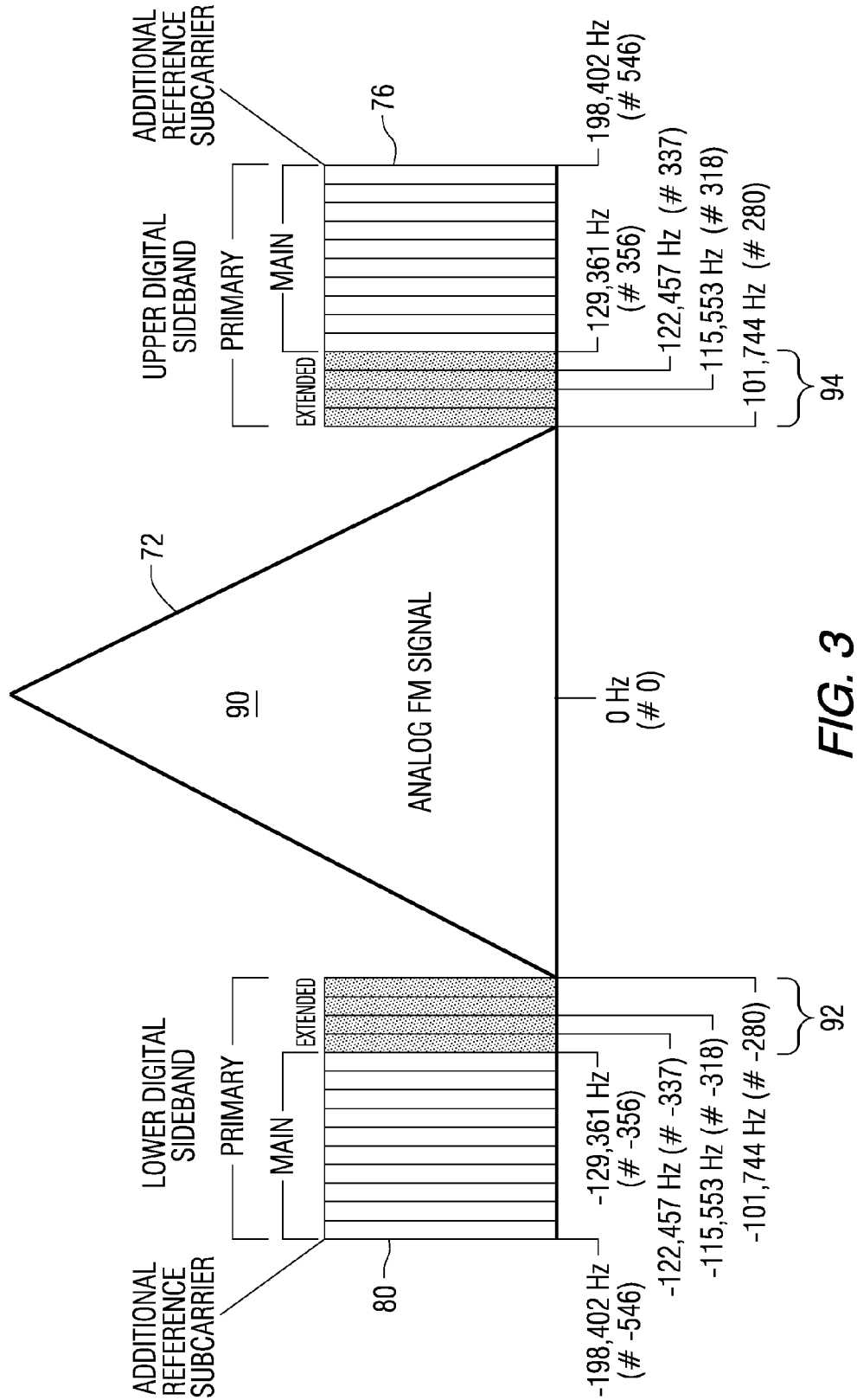
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
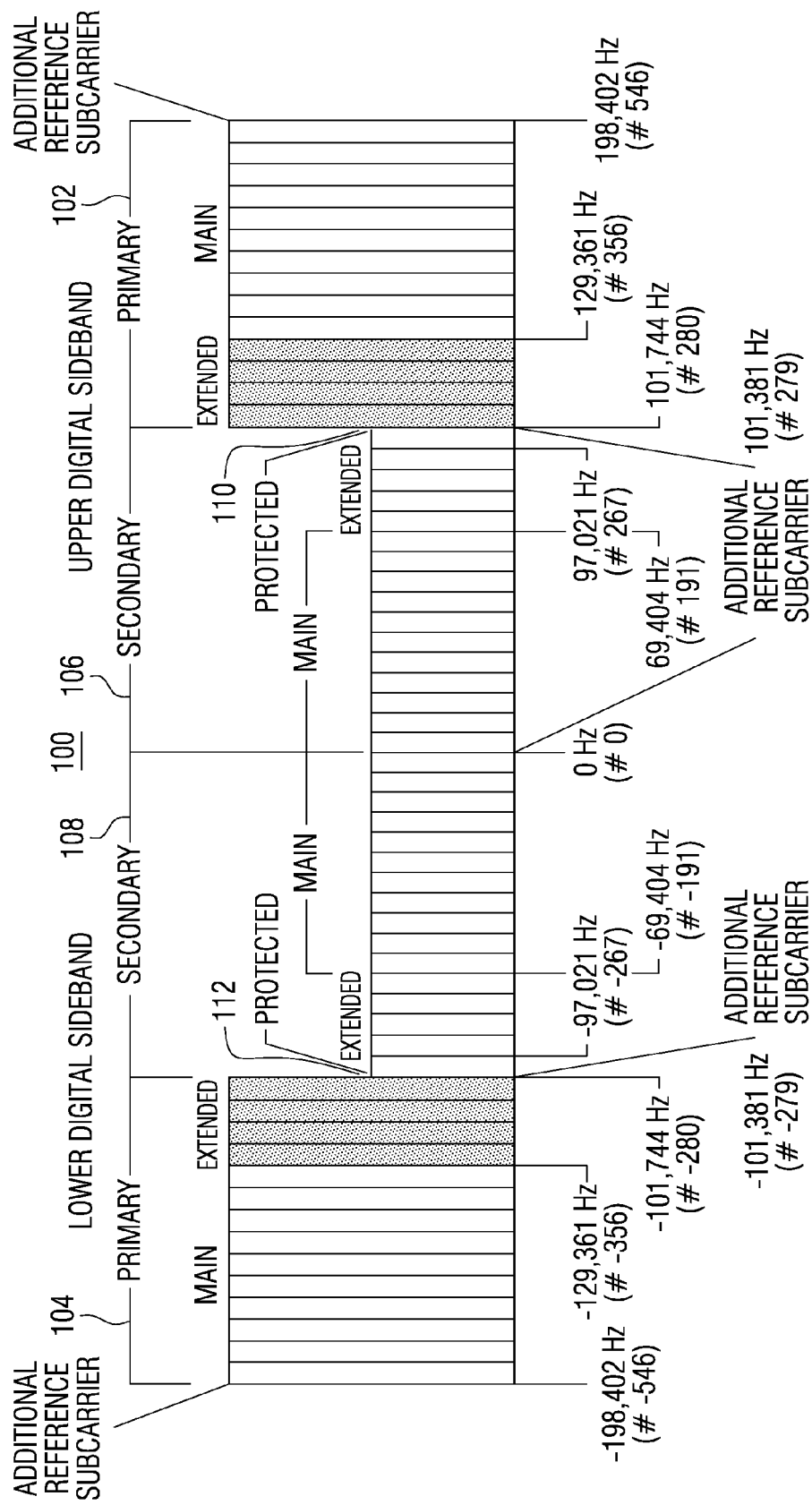
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
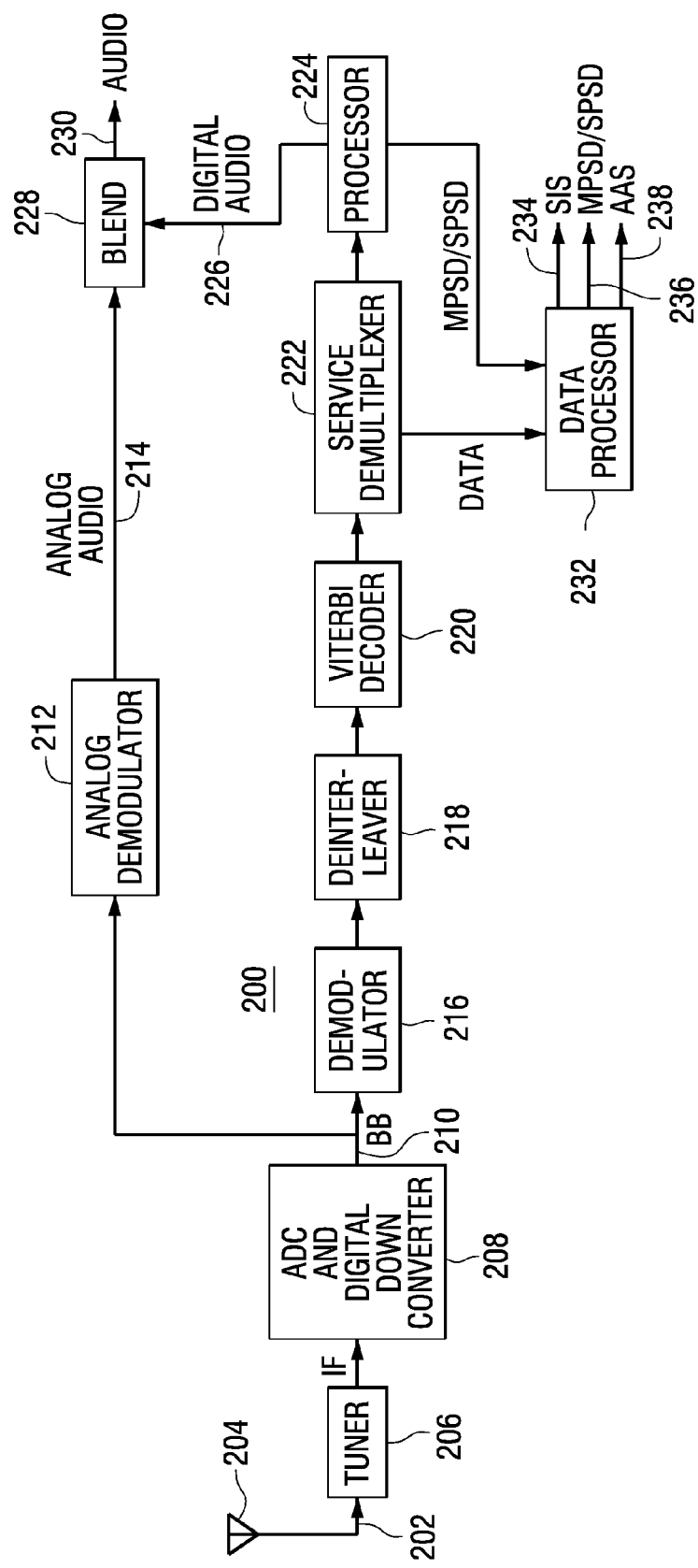
FIG. 7 is a functional block diagram of an AM IBOC DAB receiver.

FIG. 7 is a simplified functional block diagram of an AM IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
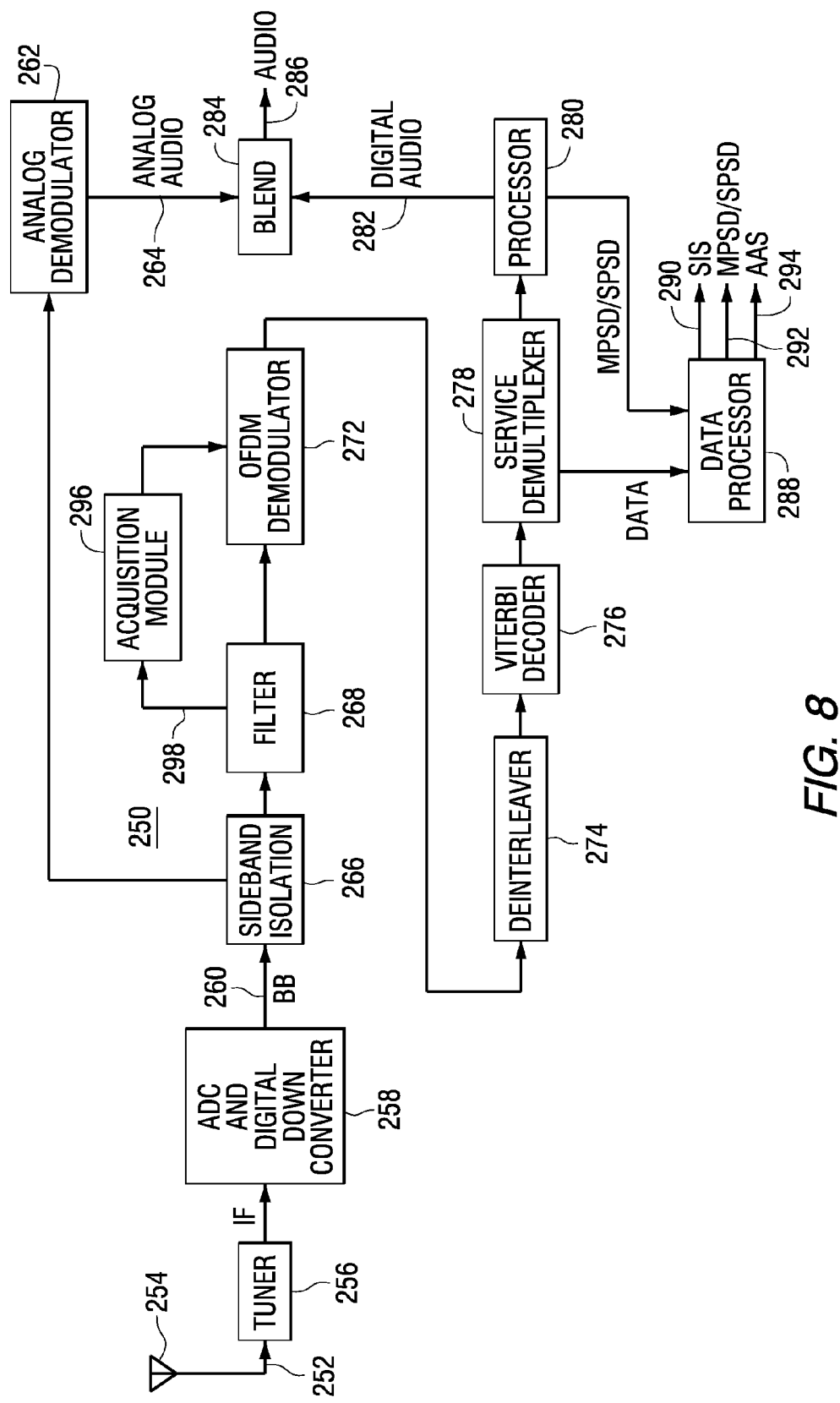
FIG. 8 is a functional block diagram of an FM IBOC DAB receiver.

FIG. 8 is a simplified functional block diagram of an FM IBOC DAB receiver 250. The receiver includes an input 252 connected to an antenna 254 and a tuner or front end 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (MPSD), supplemental program service data (SPSD), and one or more advanced application services (AAS).

In practice, many of the signal processing functions shown in the receivers of FIGS. 7 and 8 can be implemented using one or more integrated circuits.

Figure 9A:
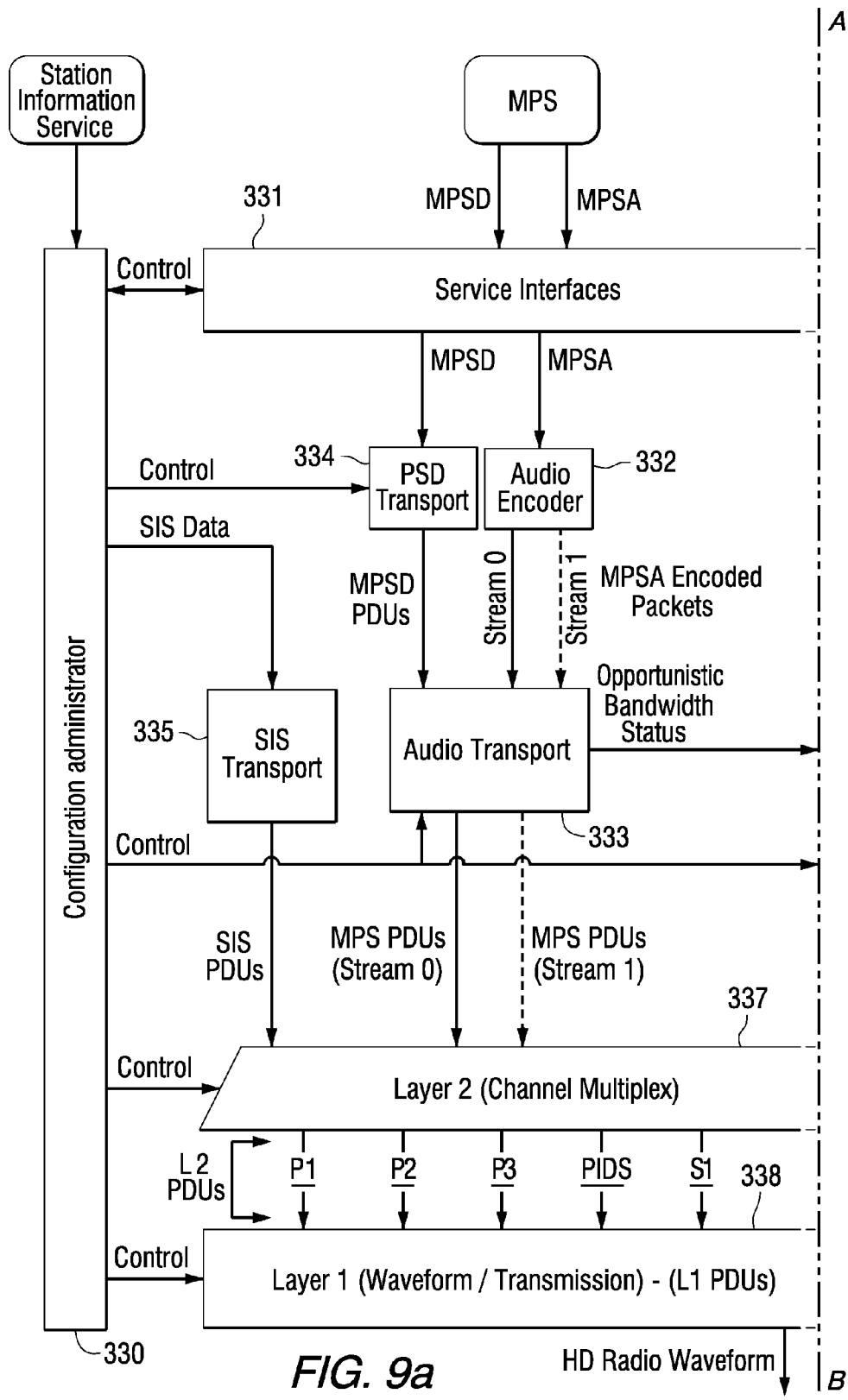
FIGS. 9a and 9b are diagrams of an IBOC DAB logical protocol stack from the broadcast perspective.
Figure 9B:
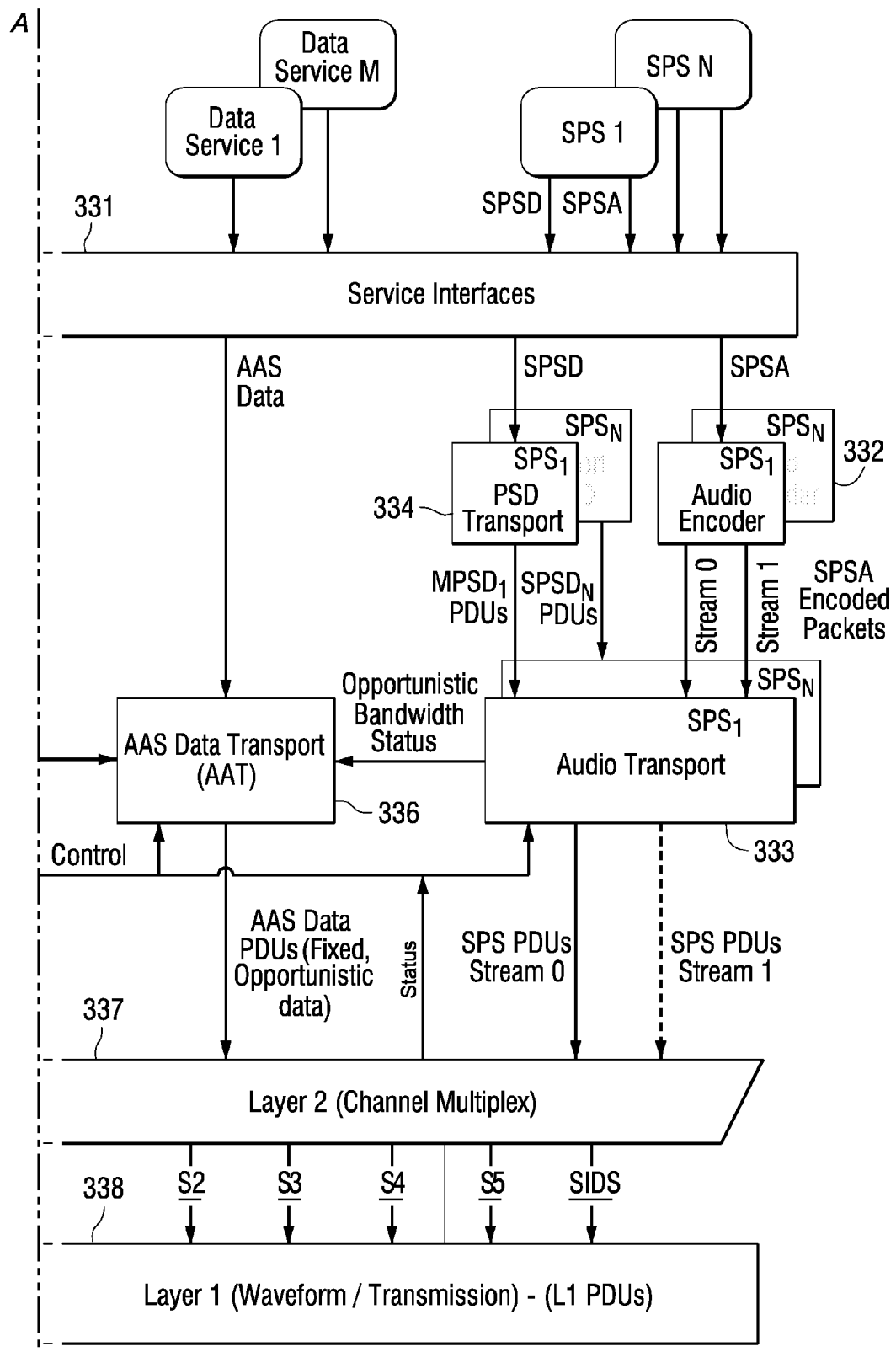

FIGS. 9a and 9b are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a and 9b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
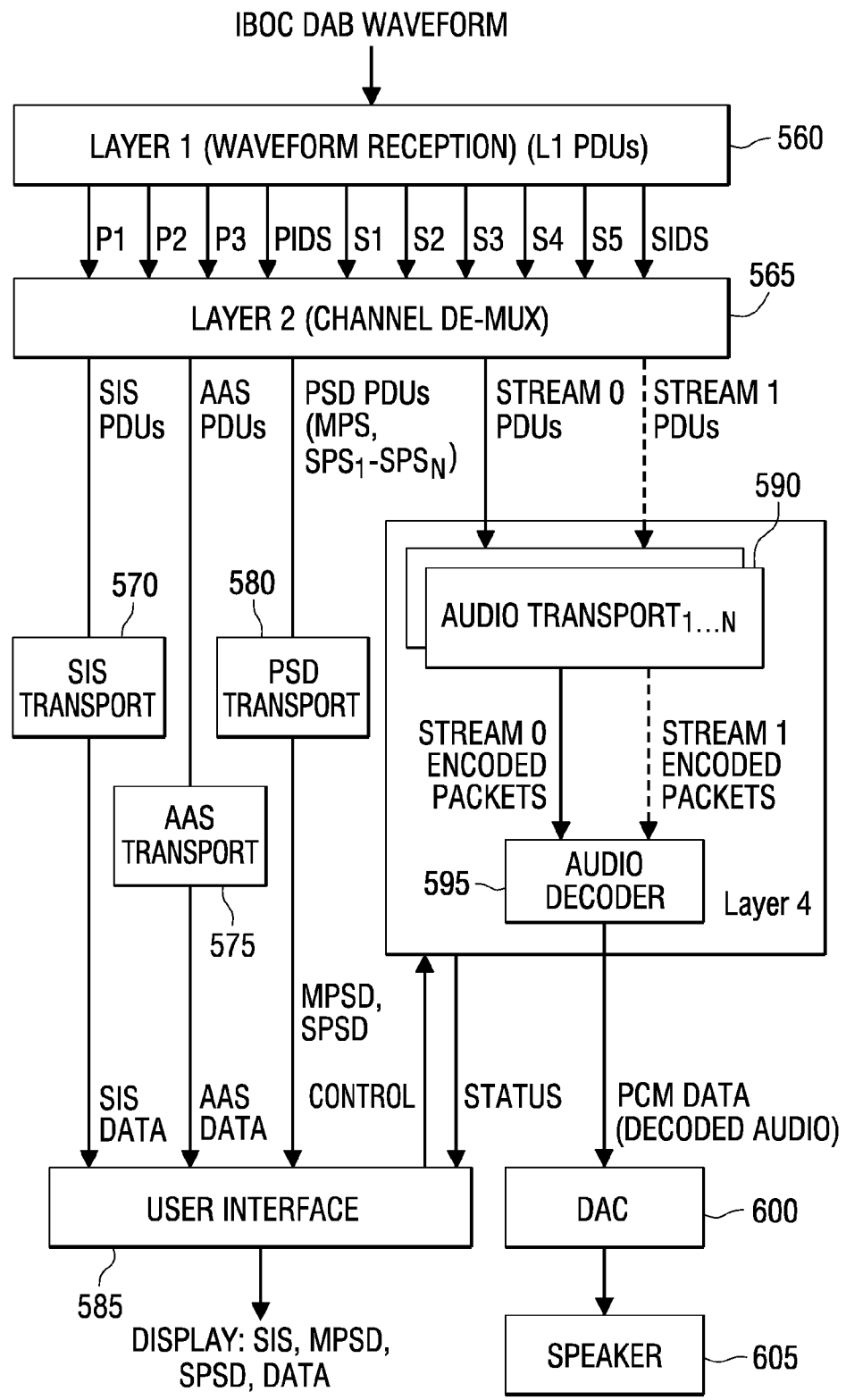
FIG. 10 is a diagram of an IBOC DAB logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, PIDS, S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (NPSD) and any SPS data (SPSD). The SIS data, AAS data, MPSD and SPSD are then sent to a user interface 590. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

Figure 11A:
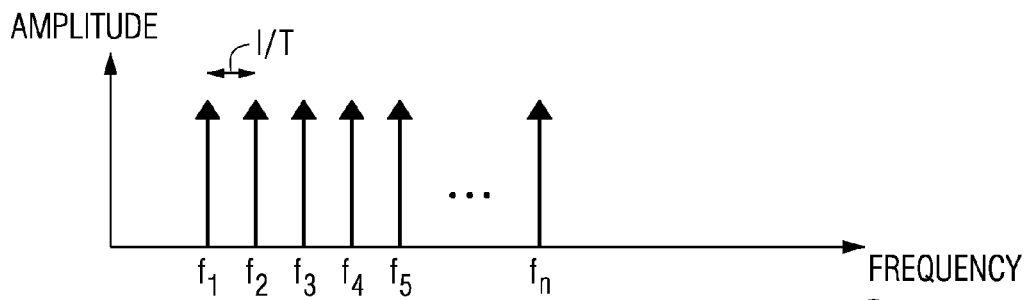
FIG. 11a is a graphical representation of an OFDM signal in the frequency domain.

As previously described, the digital portion of an IBOC signal is modulated using orthogonal frequency division multiplexing (OFDM). Referring to FIG. 11a, an OFDM signal used in the present invention is characterized as a multi-frequency carrier signal comprising the plurality of equidistantly spaced subcarriers $f_1$-$f_n$. Adjacent subcarriers, such as $f_1$ and $f_2$, are separated each from the other by a predetermined frequency increment such that adjacent subcarriers are orthogonal, each to the other. By orthogonal, it is meant that when properly Nyquist weighted, the subcarriers exhibit no crosstalk. In one hybrid system incorporating the instant invention and using both digital and analog transmission channels, there are 191 carriers in each sideband with a 70 kHz bandwidth for each sideband. In one all-digital implementation of the instant invention there are 267 carriers in each sideband with a 97 kHz bandwidth for each sideband.

Figure 11B:
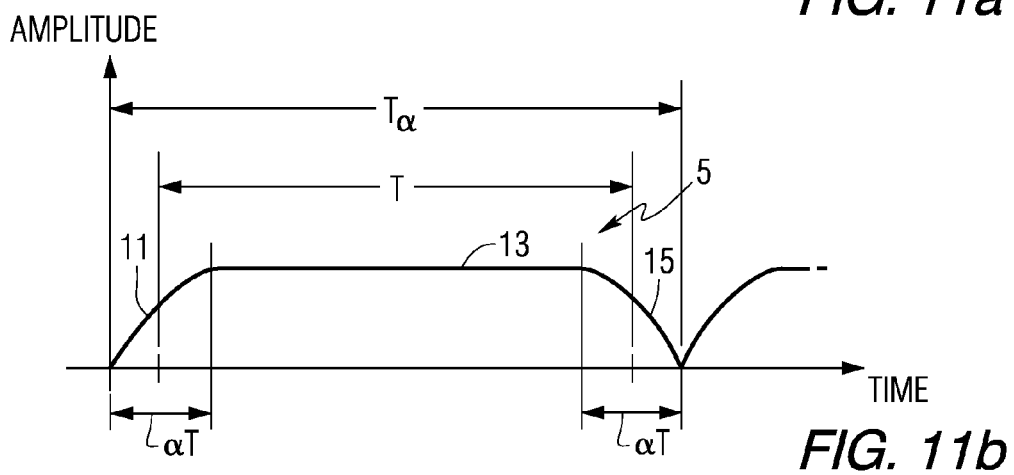
FIG. 11b is a graphical representation of the OFDM signal in the time domain.

FIG. 11b shows an OFDM symbol 5 in the time domain. The symbol has an effective symbol period or temporal width T, and a full symbol period $T_\alpha$. The OFDM subcarrier orthogonality requirement creates a functional interdependency between the effective symbol period T and the frequency spacing between adjacent OFDM subcarriers. Specifically, the frequency separation between adjacent subcarriers is constrained to be equivalent to the inverse of the effective symbol period T of each OFDM symbol 5. That is, the frequency separation is equal to 1/T. Extending across the effective symbol period T of each OFDM symbol 5 is a predetermined number N of equidistantly spaced temporal symbol samples (not shown in the figure). Further, extending across the full period $T_\alpha$ of each OFDM symbol 5 are a predetermined number $N_\alpha=N(1+\alpha)$ of equidistantly spaced temporal symbol samples. $\alpha$ is the amplitude tapering factor for the symbol, and can be considered here as a fractional multiplier. During modulation, an OFDM modulator generates a series of OFDM symbols 5, each of which comprises a predetermined number of temporal symbol samples $N_\alpha$ corresponding to full symbol period $T_\alpha$, wherein the first $\alpha N$ samples and the last $\alpha N$ samples of each symbol are tapered and have equal phases. In one embodiment, the predetermined number $N_\alpha$ of temporal samples extending across each full symbol period $T_\alpha$ is 1080, the predetermined number N of temporal samples extending across each effective symbol period T is 1024, and the number of samples in each of the first $\alpha N$ samples and last $\alpha N$ samples is 56. These values are merely exemplary and may be varied in accordance with system requirements. Also during modulation, a cyclic prefix is applied such that the leading and trailing portions of each transmitted symbol are highly correlated.

Predetermined amplitude-time profile or envelope 11, 15, 13 is imposed upon the signal levels of these samples. This amplitude profile includes symmetrically ascending and descending amplitude tapers 11, 15 at the leading portion and trailing portion of each symbol 5, respectively, and a flat amplitude profile 13 extending therebetween. These rounded or tapered edges provided in the time domain serve to substantially reduce undesirable side-lobe energy in the frequency domain, to thus provide a more spectrally efficient OFDM signal. Although the full symbol period $T_\alpha$ of symbol 5 extends beyond the effective symbol period T, orthogonality between adjacent subcarriers in the frequency domain (FIG. 11a) is not compromised so long as amplitude tapers 11, 15 of symbol 5 follow a Nyquist or raised-cosine tapering function. More specifically, orthogonality is maintained in the present invention through a combination of root-raised cosine weighting (or amplitude tapering) of transmitted symbols and root-raised cosine matched filtering of received symbols.

The leading and trailing portions of OFDM symbol 5 share an additional important feature, namely, the first $\alpha N$ OFDM symbol samples extending across the leading portion of OFDM symbol 5, which has a temporal duration $\alpha T$, have substantially equivalent phases as the last $\alpha N$ symbol samples extending across the trailing portion of OFDM symbol 5, which also has a temporal duration $\alpha T$. Note again that $\alpha$ is the amplitude tapering factor for the symbol, and can be considered here as a fractional multiplier.

Antenna Design

To mitigate performance problems due to poor reception, particularly with respect to small or portable receivers, it would be desirable to have antennas that do not require a ground plane. Two such antenna elements include a sleeve dipole and small FM loop as described herein. The sleeve dipole, as described with respect to FIGS. 12-16, forms a resonant LC circuit that obviates the need for a ground plane and allows feeding from the end of the element. The small loop antenna, as described with respect to FIG. 29, also does not require a ground plane and can be located within the receiver chassis.

Figure 12:
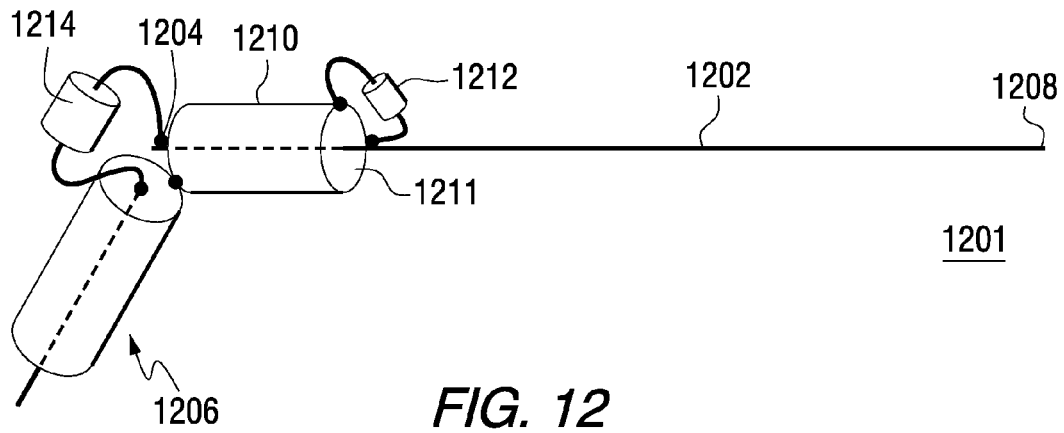
FIG. 12 is a diagram of a first end-fed sleeve dipole antenna.

FIG. 12 shows an end-fed sleeve dipole antenna 1201 according to one aspect of the present invention. The antenna is comprised of a center conductor 1202, having a base 1204 for connection to a coaxial feed 1206 to a receiver input (not shown) and an end point 1208, representing the top of the antenna. A metallic sleeve 1210 surrounds a portion of the center conductor near its base 1204, forming a coaxial capacitor. A dielectric sheath 1211 lies between the sleeve and the center conductor, insulating the two from each other. An antenna of this design for test purposes was made by taking a piece of coaxial cable, such as RG-58 Coax, and stripping a portion of the outer conducting layer away, leaving another portion of the outer conducting shield as the sleeve. Preferably, the antenna is about 30 inches (one quarter wavelength) long. An optional first inductor 1212 may be connected between the sleeve and center conductor. An optional second inductor 1214 may be connected in series between the coaxial feed to the receiver and the end of the antenna, and functions to match the LNA input impedance and provide signal gain at the tuned frequency. For a 75-ohm antenna, the sleeve 1210 is preferably about 6 inches long and the center conductor 1202 extends about a further 24 inches beyond the sleeve. The first inductor is preferably 0.44 µH and the second inductor is preferably 0.70 µH.

Figure 13:
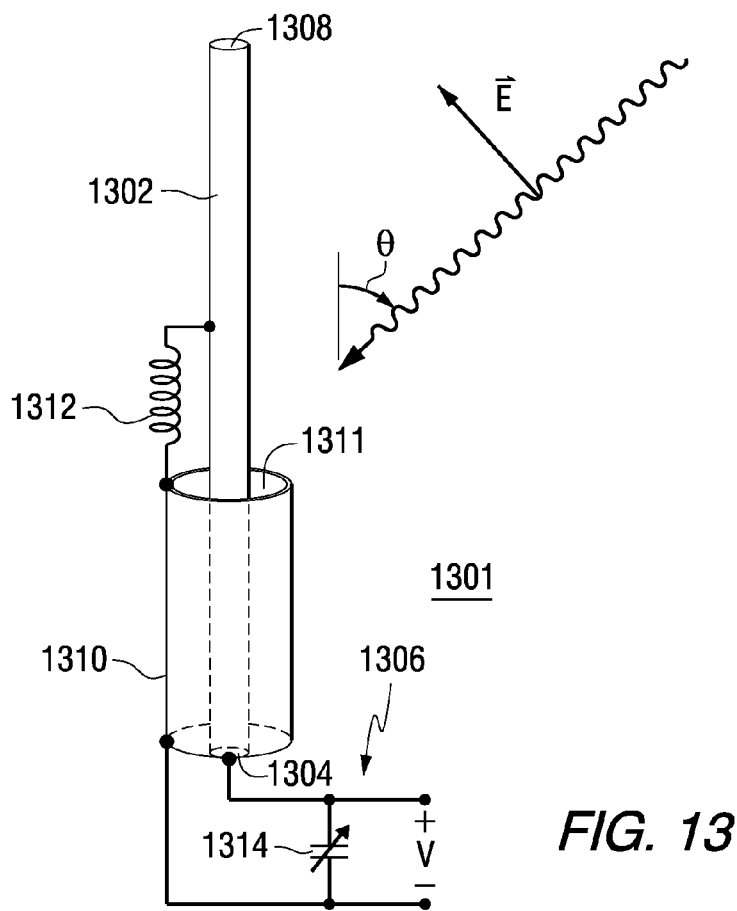
FIG. 13 is a diagram of a second end-fed sleeve dipole antenna.

A limitation of the antenna shown in FIG. 12 is that the antenna cannot achieve high resonant peak voltage gains due to its low impedance. Thus, an alternative design is shown in FIG. 13. FIG. 13 shows a high impedance end-fed sleeve dipole antenna 1301 according to an aspect of the present invention. The antenna is comprised of a center conductor 1302, having a base 1304 for connection to a coaxial feed 1306 to a receiver input (not shown) and an end point 1308, representing the top of the antenna. A conducting sleeve 1310 surrounds a portion of the center conductor near its base 1304, forming a coaxial capacitor with the antenna wire. A dielectric sheath 1311 lies between the sleeve and the center conductor, insulating the two from each other. An experimental antenna of this design for test purposes was made by taking a piece of coaxial cable, such as RG-58 Coax, and stripping a portion of the outer conducting shield layer away, leaving another portion of the outer conducting shield as the sleeve. Preferably, the antenna is about 30 inches (one quarter wavelength) long. An optional inductor 1312 may be connected between the sleeve and center conductor. For a high impedance antenna, the inductance of inductor 1312 is preferably in the range of about 0.2 µH to about 0.4 µH, and 0.2 µH in particular. An optional variable capacitor 1314 can be connected in parallel with the coaxial feed to the receiver and the end of the antenna and functions to provide signal gain with a dynamic resonance peak at the tuned frequency. Capacitor 1314 optionally may be a varactor diode, wherein the voltage to the capacitor can be varied to dynamically tune the capacitance in order to match the resonant frequency of the antenna to the tuned frequency of the receiver.

Figure 14:
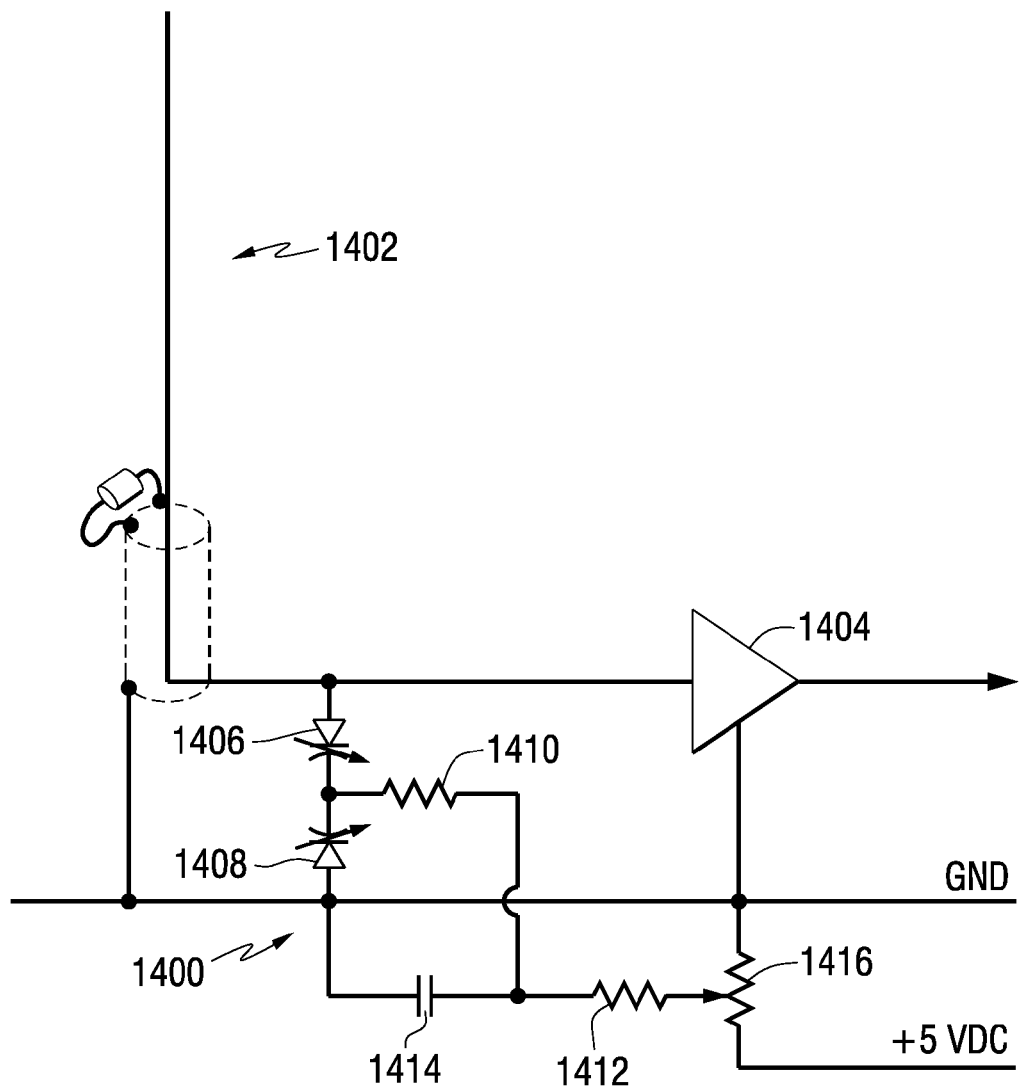
FIG. 14 is a diagram of an end-fed sleeve dipole antenna with a varactor manual tuning circuit.

FIG. 14 shows an end-fed sleeve dipole antenna design including a varactor manual tuning circuit 1401 as an alternative to implementing an automatic adaptive impedance matching algorithm. End-fed sleeve dipole antenna 1402 is connected to a high impedance, low noise amplifier 1404, representative of a receiver front end. The tuning circuit is comprised of a first varactor diode 1406, a second varactor diode 1408, first resistor 1410, second resistor 1412, and capacitor 1414. Resistors 1410 and 1412 are preferably 100 KΩ resistors and capacitor 1414 is preferably 1° F. A tuning voltage is applied across a third (variable) resistor 1416, which is also preferably 100 KΩ.

Figure 15:
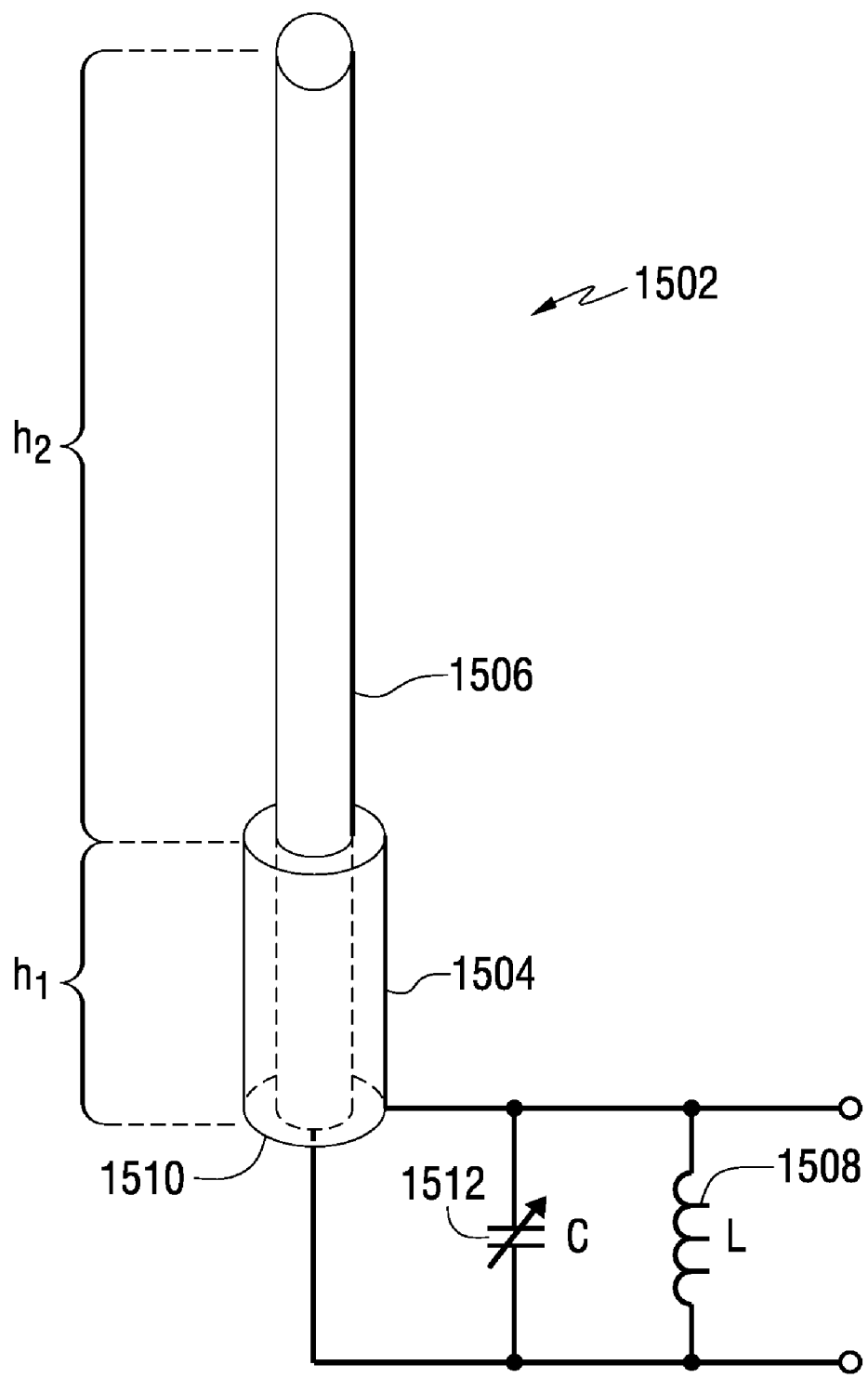
FIG. 15 is a diagram of a third end-fed sleeve dipole antenna.

The antennas described herein can be used in combination with one or more speakers, which can be for example various types of headphones or earbuds. Referring again to FIG. 13, the location of inductor 1312 at the top of the end-fed sleeve dipole could complicate productization of the antenna in an earbud configuration. If the center conductor is replaced with four earbud wires, such a design might require a separate inductor for each of four earbud wires, thereby increasing complexity and cost. Instead, a different embodiment of the invention places the inductor at the base of the sleeve, while the upper end of the sleeve is terminated in an open circuit, as shown in FIG. 15. Preferably, the height $(h_1+h_2)$ of antenna 1502 is about 30 inches (quarter-wavelength) and the height $h_1$ of sleeve 1504 is about 5.5 inches. Like other embodiments of the end-fed sleeve dipole, the antenna sleeve 1504 and center conductor 1506 form a coaxial capacitor that resonates with the base inductor 1508 to form a resonant circuit that supplies a reservoir of electrical charge, obviating the need for a ground plane. The lower end 1510 of the antenna would be connected to a high impedance low noise amplifier (not shown) in the receiver, whose capacitance also resonates with the inductance L to form a resonant voltage peak at the amplifier input. The capacitance of variable capacitor 1512, which can be implemented as a varactor diode, may be adjusted by the adaptive impedance matching algorithm described herein to align the voltage resonant peak at the amplifier input with the receiver tuned frequency, and to account for human body effects and antenna orientation. As shown below, assuming an LNA shunt capacitance and resistance of 3 pF and 1 Mohm, respectively, a value of L=0.9 µH would place the resonant peak at the upper end of the FM band. Automatic adjustment of C by the adaptive impedance matching algorithm would then shift the peak to the proper frequency, as determined by receiver tuning and listener interaction.

Figure 16:
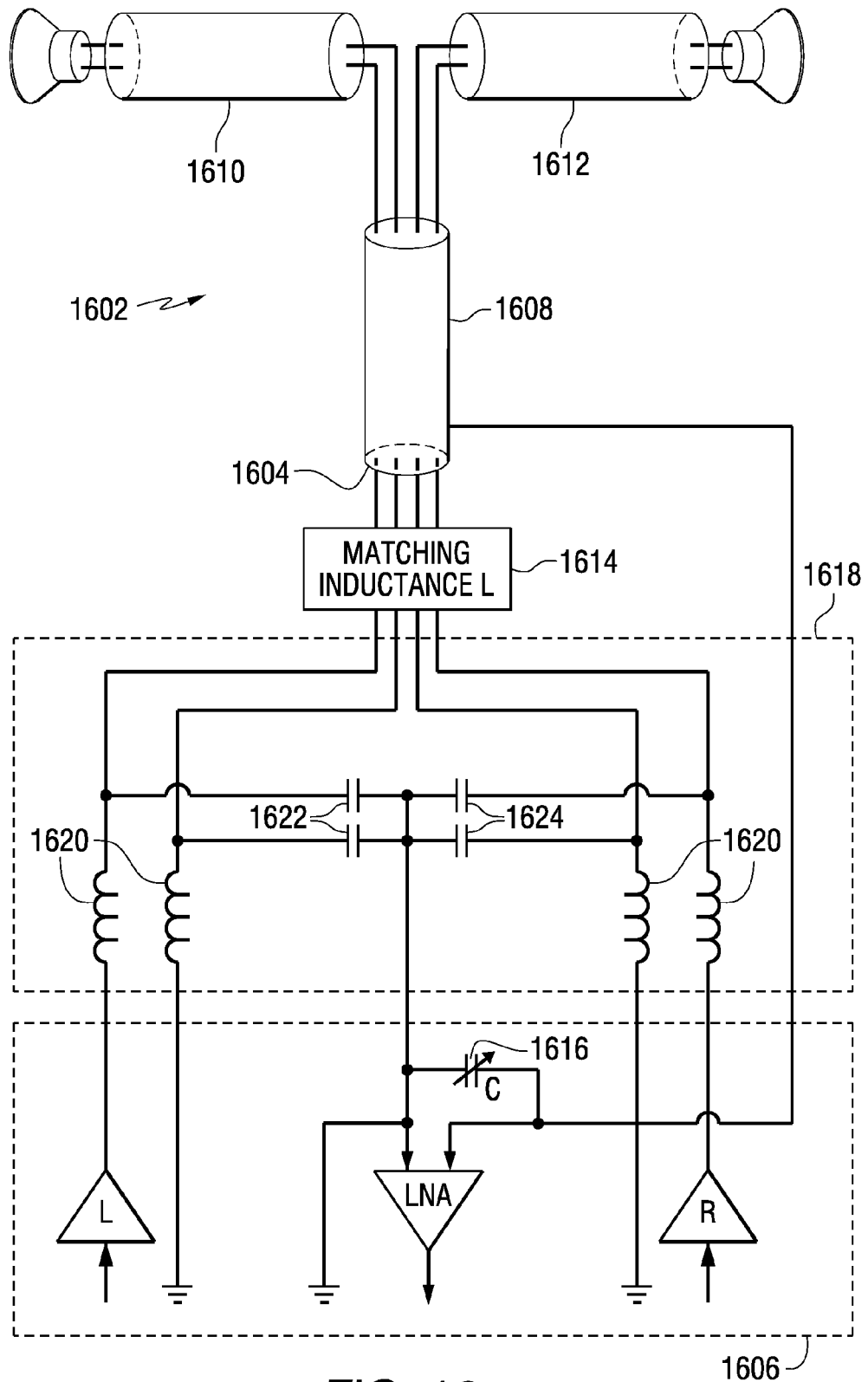
FIG. 16 is a diagram of an earbud wire antenna design including an end-fed sleeve dipole.
Figure 17:
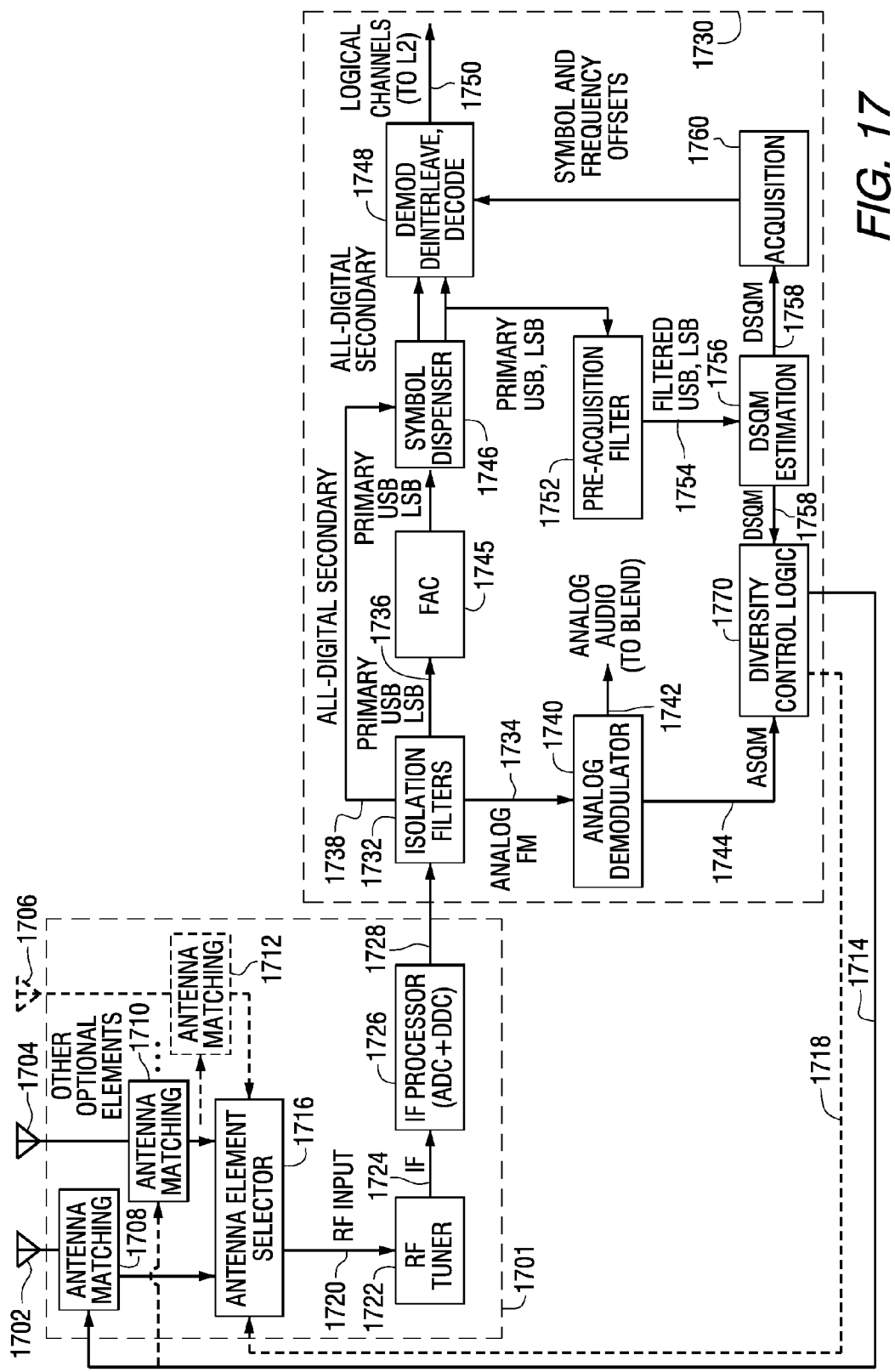
FIG. 17 is a functional diagram of a receiver design incorporating diversity algorithms according to an aspect of the invention.

Placing the inductor at the base of the antenna allows straightforward productization of the end-fed sleeve dipole, since only one inductor is required. For mass-produced portable devices, the end-fed sleeve dipole could be configured in the form of an earbud wire antenna 1602, as shown in FIG. 16. The length of existing speaker (e.g., earbud) wires is consistent with the desired 30-inch length of the sleeve dipole antenna. The base 1604 of the antenna could connect directly to the receiver input 1606 in a manner similar to existing earbud wire antennas (e.g., via mini plug). The lower 5.5 inches of the antenna has an additional outer sleeve 1608 comprised of a conducting metal shield and substantially coaxial to the left and right conducting wires 1610 and 1612. The inductor 1614 can be molded into the antenna or placed in the receiver, while the variable capacitor 1616 can be located within the receiver, either as a discrete component in the analog RF front end, or integrated directly into the RF/IF Processor IC 1701 (FIG. 17). Earbud interface circuitry 1618 found in typical portable receivers could be used, with inductors 1620 choking RF from the audio input, and capacitor pairs 1622 and 1624 blocking audio from the RF input.

Figure 29:
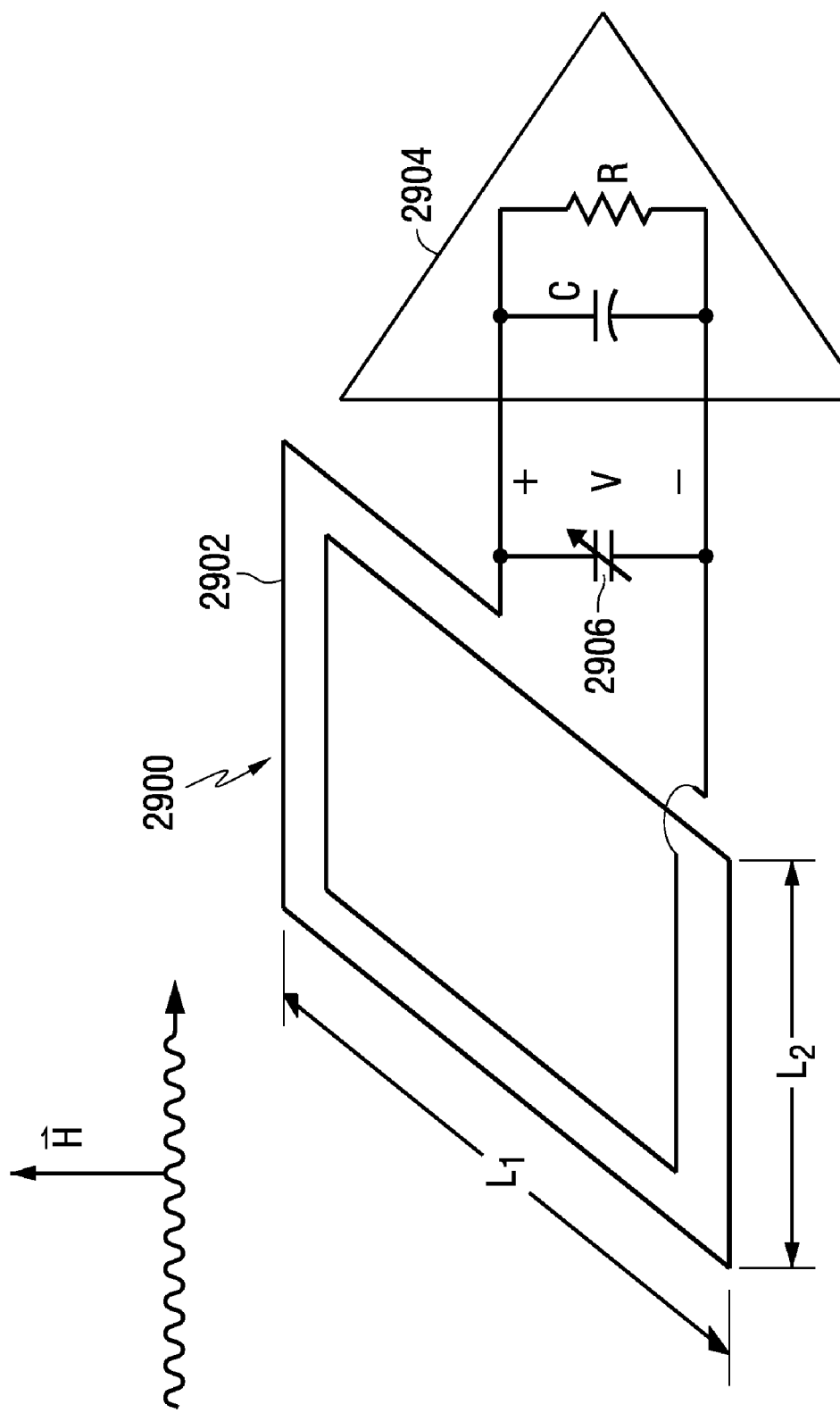
FIG. 29 is a diagram of a loop antenna design.

FIG. 29 shows a loop antenna 2900 according to an aspect of the present invention. The antenna is comprised of a wire 2902 having a radius α. The wire is shaped to form N turns (or loops) having a first dimension $L_1$ and a second dimension $L_2$ and forming a square, rectangle, or other suitable shape. For test purposes, the antenna is shown connected to a high impedance amplifier 2904 modeled as a resistance R in parallel with a capacitance C. A tuning capacitor 2906 can be used to control resonance so that the antenna resonates in the middle of the FM band (approximately 100 MHz), or resonates at the tuned frequency for high-Q, high-gain operation.

It is desirable for the capacitance of capacitor 2906 to exceed the internal capacitance of the high impedance amplifier 2904, representative of a receiver input, which is approximated as 3 pF. The loop antenna is preferably incorporated within the casing of a receiver device, the perimeter and dimensions of which limits the size and shape of the loop. As an example, given a rectangular loop wherein L1=1.2 inches and L2=1.7 inches, having a wire with radius α=0.015 inches, and N=1 turn, the capacitor 2906 is preferably approximately 4 pF at a tuned frequency of 108 MHz, approximately 5 pF at a tuned frequency of 98 MHz, and approximately 6 pF at a tuned frequency of 88 MHz. It is expected that the antenna voltage gain factor increases as N increases and that the inductance of the loop increases as $N^2$. Because the antenna is located within a receiver device, it is important to control electromagnetic interference (EMI), which can degrade the performance of the antenna. Furthermore, proximity of the loop to a metallic ground plane in the receiver can also degrade performance. An orthogonally-oriented pair of loop antennas may be used with the diversity algorithm to achieve omnidirectional coverage for any orientation of the radio receiver. This pair may also be used with the sleeve antenna for a 3-element diversity system.

A loop antenna element may be used in conjunction with an end-fed sleeve dipole antenna integrated into earbuds, or it may be used alone, such as with Bluetooth-enabled devices that are not used with earbuds. Preferably, a receiver device will use both antennas in order to exploit the complementary properties of the loop antenna and earbud wire antenna. The earbud wire, which functions as an E-field element, is affected by its position relative to the human body, which can cause an electrical short and attenuate the signal. In contrast, proximity to the human body can enhance the performance of the loop antenna, which functions as an H-field element. Moreover, employing antenna diversity can reduce intermittent reception outages, which can be particularly annoying to a listener of digital radio broadcasts.

Antenna Element Diversity and Adaptive Impedance Matching

FIG. 17 is a functional diagram of an FM receiver having multiple antenna elements 1702, 1704, and 1706 and employing antenna element diversity, as well as adaptive impedance matching functions according to an aspect of the present invention. Antenna element 1702 can be an end-fed sleeve dipole antenna incorporated into an earbud wire, as previously described; antenna element 1704 can be a loop antenna as previously described; and element 1706 represents one or more additional, optional antennas. Within an RF/IF processor 1701, a first antenna matching circuit 1708 dynamically matches the impedance of antenna element 1702 to the receiver, a second antenna matching circuit 1710 dynamically matches the impedance of antenna element 1704 to the receiver, and optional additional antenna matching circuits 1712 can be used to dynamically match the impedance of any additional antenna elements to the receiver. While the antenna matching functionality is shown in FIG. 17 as part of the RF/IF processor, this functionality may be implemented in other discrete components of a receiver device such as an RF front end. The antenna matching algorithms are responsive to an adaptive impedance matching control signal 1714 and they preferably function in accordance with the adaptive impedance matching algorithm described herein. Antenna element selector 1716 selects a signal from one of the antenna elements based on an antenna element diversity control signal 1718, and passes that signal as an RF input 1720 to RF tuner 1722. Alternatively, the antenna element selector can pass on the sum or difference of the various antenna elements. RF tuner produces an IF signal 1724, which is converted from analog to digital and digitally down converted by IF processor 1726 to produce baseband signal 1728 at a rate of 744,187.5 complex samples per second.

The baseband signal is received by baseband processor 1730, which applies isolation filters 1732 to produce a digitally sampled, analog signal 1734 at a rate of 186,046.875 complex samples per second, primary upper sideband and lower sideband digital signals 1736 at a rate of 186,046.875 complex samples per second, and an all-digital secondary signal 1738 at a rate of 372,093.75 complex samples per second. Analog demodulator 1740 receives the digitally sampled analog signal 1734 and produces an analog audio output 1742 and an analog signal quality metric (ASQM) 1744. The operation of analog demodulator 1740 and calculation of the ASQM is shown and described in more detail in FIGS. 26-28 and the accompanying description. A first-adjacent cancellation operation 1745 is applied to the primary upper and lower sidebands in order to minimize any interference from a first-adjacent signal. Symbol dispenser 1746 aligns and dispenses the incoming data stream into segments representing one OFDM symbol. The all-digital secondary signal and primary upper and lower sidebands are then demodulated, deinterleaved, and decoded (1748), and then passed as logical channels 1750 to Layer 2 of the receiver protocol stack for demultiplexing, as described with respect to FIG. 10. A pre-acquisition filtering process 1752 is applied to the primary upper and lower sidebands to produce filtered upper and lower sideband signals 1754 at a rate of 46,511.71875 complex samples per second. DSQM estimation 1756 calculates a digital signal quality metric (DSQM) 1758 which is used by the diversity control logic 1770 and the remaining acquisition processing 1760, which produces symbol timing and frequency offsets. The pre-acquisition filtering, DSQM estimation, and acquisition functionalities are shown and described in more detail in FIGS. 18-25 and the accompanying description. Diversity control logic 1770 receives the analog signal quality metric 1744 and digital signal quality metric 1758 and produces an adaptive impedance matching control signal 1714 (described in more detail in a subsequent section) and antenna element diversity control signal 1718. Diversity control logic 1770 preferably receives signals 1744 and 1758 at an update rate of roughly 20 Hz or lower for portable devices.

Diversity Control Logic

For the antenna element diversity control signal, the diversity control logic 1770 can employ an algorithm that selects among the antenna elements or some combination thereof. For example, two antenna elements $E_0$ and $E_1$ can provide up to four selection options: $E_0$, $E_1$, $E_0+E_1$, and $E_0-E_1$. In another embodiment, the diversity control logic implements a "blind" diversity algorithm, wherein a second antenna element is used when the first antenna element fails, regardless of whether the second antenna element would be better or worse than the first. Preferably, the diversity control logic functions as a state machine, which is updated to assess the switching action that should be taken based on an impedance matching or tuning value vector for each antenna element. The diversity control logic will allow the receiver to dwell on a particular antenna element and impedance-matching value until the ASQM and DSQM signals 1744 and 1758 fail to meet certain dynamic criteria, such as minimum desired signal quality thresholds, or dynamic thresholds established with an algorithm intended to maximize performance, even if a present metric is barely acceptable. The logic then determines a switching sequence that favors the best antenna element and impedance values. For example, one particular antenna element may generally provide a better signal than other elements or combinations, although occasionally an alternate element or combination is preferred. In this case, the algorithm would learn about the better element, and tend to favor this element more frequently than the other options in its not-quite-blind switching sequence. In this manner, excessive switching due to improbable combinations are avoided, and the switching sequence can adapt to changing conditions based on recent history of states and gradients. In another embodiment, the received signal strength indication (RSSI) can be used. Although this method may be simpler, it is not as effective as the DSQM or ASQM methods.

Adaptive Impedance Matching Control

As previously described with respect to FIGS. 12-15, it is desirable to dynamically tune the output resonant voltage peak of the end-fed sleeve dipole antenna and the loop antenna to the receiver tuned frequency, in order to account for the effects of the human body on the antennas and the movement of the user. Adaptive impedance matching according to an aspect of the present invention can be used for that purpose. Adaptive impedance matching can be accomplished using a voltage-controlled antenna matching circuit (FIG. 17, 1708) that tunes a resonance peak, wherein the voltage control can be a pulse-width-modulated digital signal into an RC filter. This provides an economical means for generating a slowly varying dc control voltage for a varactor diode in the antenna matching circuit 1708, since it obviates the need for a D/A converter, replacing it with a digital signal output whose duty-cycle determines the dc voltage, and a low-pass RC filter. Alternatively, an impedance-matching value can be selected from a set of values for each antenna element. For example, two impedance values $Z_1$ and $Z_2$ provide four selection options, i.e., $Z_1$, or $Z_2$, or $Z_1+Z_2$, or $Z_1\|Z_2$ (parallel). Diversity control logic 1770 (FIG. 17) controls this selection, using the digital and analog signal quality metrics described below.

Digital Signal Quality Metric

Figure 18:
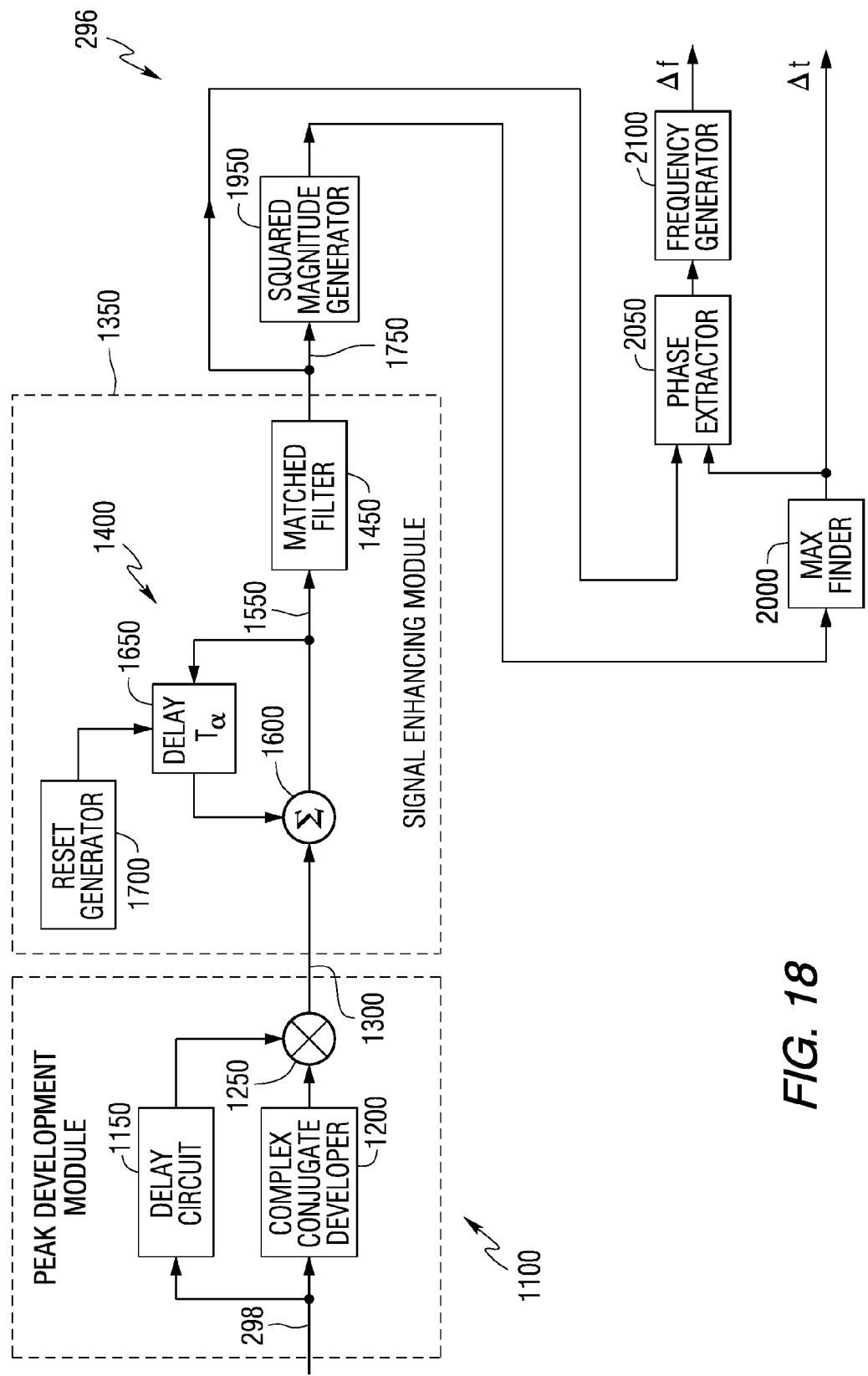
FIG. 18 is a block diagram of one embodiment of an acquisition module.

To implement a digital signal quality metric, an acquisition module is used. One embodiment of a basic acquisition module 296, described in U.S. Pat. Nos. 6,539,063 and 6,891,898, is shown in FIG. 18. Received complex signal 298 is provided to the input of peak development module 1100, which provides the first stage of signal processing for acquiring the symbol timing offset of the received OFDM signal. Peak development module 1100 develops a boundary signal 1300 at an output thereof, which has a plurality of signal peaks therein, each signal peak representing a received symbol boundary position for each received OFDM symbol represented in received signal 298, input to peak development module 1100. Because these signal peaks represent received symbol boundary positions, their temporal positions are indicative of received symbol timing offset. More specifically, because the receiver has no initial or a priori knowledge of the true or actual received symbol boundary position, such a position is initially assumed or arbitrarily created to enable receiver processing to operate. Acquisition module 296 establishes the symbol timing offset Δt that exists between this a priori assumption and the true, received symbol boundary position, thus enabling the receiver to recover and track symbol timing.

In developing the signal peaks representing OFDM symbol boundaries, peak development module 1100 exploits the cyclic prefix applied by the transmitter, as well as the predetermined amplitude tapering and phase properties inherent in the leading and trailing portions of each received OFDM symbol. Particularly, complex conjugate products are formed between the current sample and the sample preceding it by N samples. Such products, formed between the first αN samples and the last αN samples in each symbol, produce a signal peak corresponding to each symbol comprising the αN conjugate products so formed.

Figure 11C:
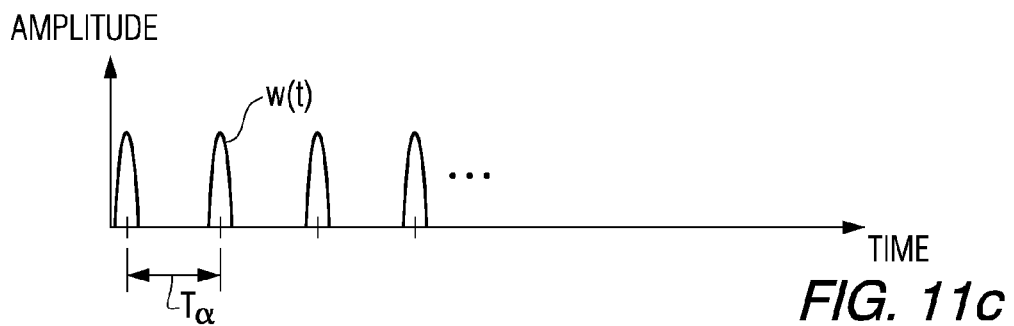
FIG. 11c is a graphical representation of the conjugate product signal peaks representing symbol boundaries.
Figure 11D:
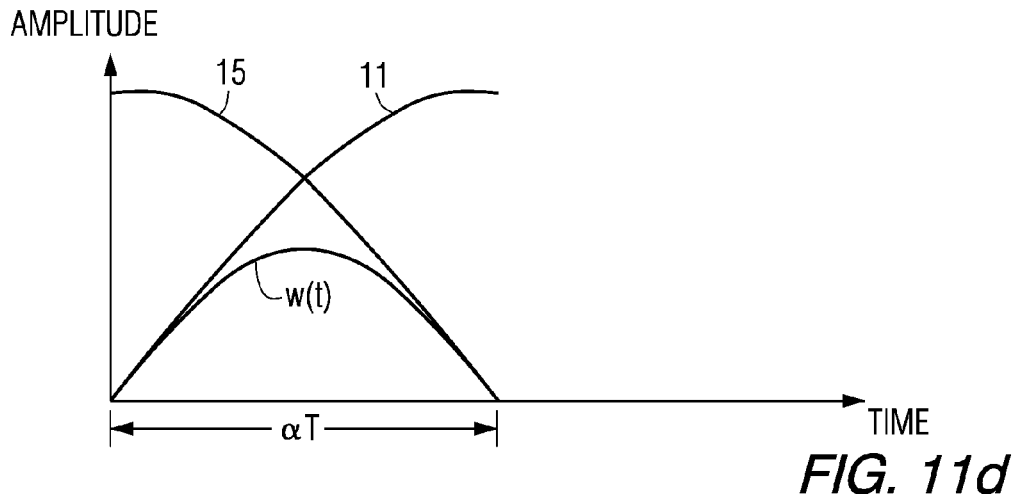
FIG. 11d is a graphical illustration of the conjugate products multiplied by respective amplitude tapers.

Mathematically, the formation of the conjugate products is represented as follows. Let D(t) denote the received OFDM signal, and let $T_\alpha=(1+\alpha)T$ denote the full OFDM symbol duration or period where 1/T is the OFDM channel spacing and α is the amplitude tapering factor for the symbol. The signal peaks in boundary signal 1300 appear as a train of pulses or signal peaks in the conjugate products of D(t)·D*(t−T). As a result of the Nyquist amplitude tapering imposed on the leading and trailing portions of each OFDM symbol, each of the pulses or signal peaks has a half-sine-wave amplitude profile of the form $w(t)=\{½\sin(\pi t/(\alpha T)), \text{ for } 0\leq t\leq \alpha T, \text{ and}$ $w(t)=\{0, \text{ otherwise.}$ Further, the periodicity of signal 1300, that is, the period of the train of signal peaks, is $T_\alpha$. Referring to FIG. 11c, the train of signal peaks included in boundary signal 1300 has amplitude envelope w(t) and the peaks are spaced by a period of $T_\alpha$. Referring to FIG. 11d, the product of the overlapping leading and trailing portion amplitude tapers 11, 15 multiplies the squared magnitudes in the conjugate products, resulting in the half-sine-wave, w(t) which has a durational width αT corresponding to αN samples.

Returning again to FIG. 18, for each signal sample input to peak development module 1100, one product sample is output from multiplier circuit 1250 representing a conjugate product between that input sample and a predecessor sample, spaced T samples therefrom. Complex conjugate developer 1200 produces at its output the complex conjugate of each input sample, which output is provided as one input to multiplier 1250. The conjugate samples at this output are multiplied against the delayed sample output from delay circuit 1150. In this way, complex conjugate products are formed between the received signal 298 and a delayed replica thereof obtained by delaying the received signal 298 by the predetermined time T using delay circuit 1150.

Figure 19A:
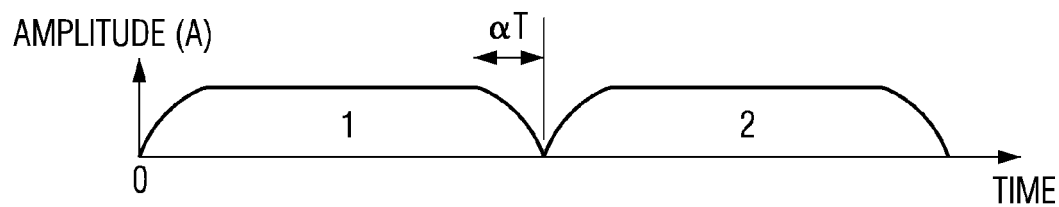
FIGS. 19a, 19b, and 19c are graphical representations of symbol timing for a peak development module.
Figure 19B:
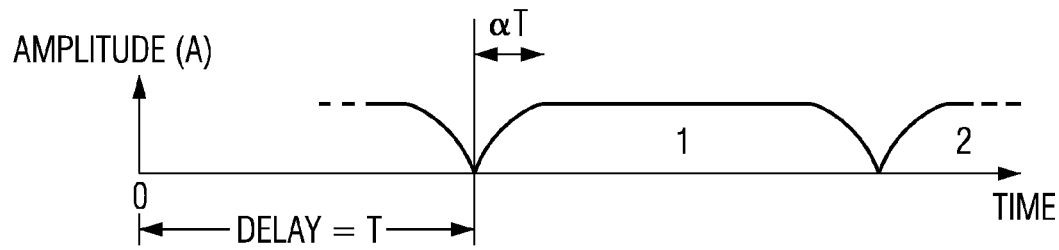
Figure 19C:
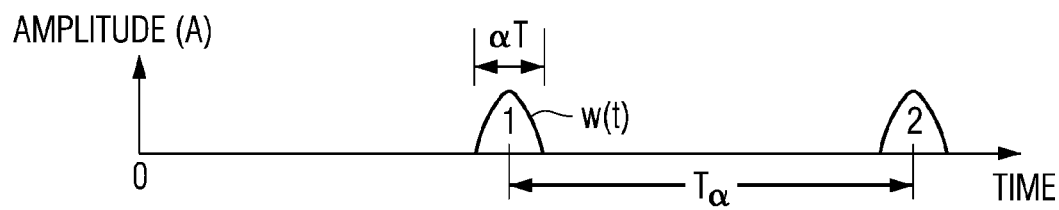

Referring to FIGS. 19a, 19b, and 19c, the relevant symbol timing for peak development module 1100 is illustrated. FIG. 19a represents consecutive OFDM symbols 1 and 2 provided at the input to peak development module 1100. FIG. 19b illustrates the delayed versions of OFDM symbols 1 and 2 as output from delay circuit 1150. FIG. 19c represents the signal peak developed for each corresponding set of N=N(1+α) product samples (which in one working embodiment equals 1080 samples), the train of signal peaks being produced responsive to the conjugate multiplication between the received signal of FIG. 19a and the delayed version thereof in FIG. 19b.

By way of specific example, if the received OFDM symbol period $T_\alpha$ corresponds to $N_\alpha=1080$ signal samples, and the αN samples at each of the leading and trailing portions of the symbol correspond to 56 signal samples, then for each 1080- sample OFDM symbol input to peak development module 1100, there appears a corresponding set of 1080 product samples in boundary signal 1300. In this example, delay circuit 1150 imparts a 1024-(N) sample delay so that each sample input to multiplier 1250 is multiplied by its predecessor 1024 samples away. The signal peak so developed for each corresponding set of 1080 product samples comprises only 56 conjugate products formed between the first and last 56 samples of each corresponding symbol.

Peak development module 1100 can be implemented in any number of ways as long as the correspondence between the leading and trailing portions of each symbol is exploited in the manner previously described. For instance, peak development module 1100 may operate on each sample as it arrives, so that for each sample in, a product sample is provided at the output thereof. Alternatively, a plurality of samples may be stored, such as in vector form, thus creating present sample vectors and delayed sample vectors, which vectors can be input to a vector multiplier to form vector product samples at an output thereof. Alternatively, the peak development module can be implemented to operate on continuous rather than sampled discrete time signals. However, in such an approach, it would be desirable that input received signal 298 also be a continuous rather than a sampled signal.

Ideally, boundary signal 1300 has easily identifiable signal peaks therein, as illustrated in FIGS. 11c and 19c. However, in reality, each signal peak is virtually indistinguishable from the undesired noisy products of samples lying in adjacent symbols. Since peak development module 1100 continually forms products between samples extending across each received symbol and predecessor samples delayed therefrom, boundary signal 1300 includes both desired signal peaks as well as the noisy conjugate products. For example, the first $\alpha N$ (56) samples in each symbol are multiplied against the last $\alpha N$ samples therein, to produce the desired signal peak $\alpha N$ samples in duration. However, the remaining N (1024) samples are multiplied against N samples from the adjacent symbol responsive to the delay imparted thereto by delay circuit 1150 (see FIG. 18). These additional unwanted products have the effect of filling in noise between the occurrences of the desired signal peaks. Thus, noisy products corresponding to OFDM signals can be appreciable.

In addition to the presence of the aforementioned product noise in boundary signal 1300, there is noise derived from other sources well known in the art of digital communications. Such noise is imparted to the signal during propagation thereof through the atmosphere by ambient noise, scattering, multipath and fading, and signal interferences. The front end of the receiver also adds noise to the signal.

Subsequent signal processing stages are dedicated, in part, to combating the depreciating effect of the aforementioned noise with respect to the desired signal peaks in boundary signal 1300, or more specifically, to improve the signal-to-noise ratio of the signal peaks present in boundary signal 1300. Signal enhancing module 1350 is provided at the output of peak development module 1100, and comprises first and second stage signal enhancing circuits or modules. The first stage signal enhancing circuit is an additive superposition circuit or module 1400 and the second stage enhancing circuit is a matched filter 1450, provided at the output of the first stage enhancing circuit.

Additive superposition circuit 1400 additively superimposes a predetermined number of signal peaks and their surrounding noisy products, to enhance signal peak detectability by increasing the signal-to-noise ratio of the signal peaks in boundary signal 1300. To implement this process of additive superposition, a predetermined number of consecutive segments of boundary signal 1300 are first superimposed or overlapped in time. Each of these superimposed segments comprises a symbol period's worth of conjugate product samples as are output from peak development module 1100, and includes a desired signal peak surrounded by undesired noisy product samples.

After the predetermined number or block of signal segments have been time overlapped, the product samples occupying a predetermined temporal position in the superimposed set of segments are accumulated to form a cumulative signal sample for that predetermined position. In this way, a cumulative signal is developed comprising a cumulative signal sample for each of the predetermined sample positions extending across the superimposed boundary signal segments.

If, for example, 32 contiguous boundary signal segments are to be superimposed, and if each segment includes a symbol period's worth of 1080 samples, then additive superposition circuit 1400 produces 1080 cumulative samples for each contiguous block of 32 segments (1080 samples per segment) input thereto. In this manner, the conjugate products of 32 segments (each segment including 1080 samples, a signal peak and noise therein) are additively superimposed or "folded" on top of one another, by pointwise adding the superimposed conjugate products of the 32 segments. Essentially, in this folding process, the products of the 32 segments are pointwise added to corresponding conjugate products one symbol period (or 1080 samples) away, over the 32 contiguous symbols, to produce a cumulative signal segment comprising 1080 cumulative samples therein. The signal processing is then repeated for the next contiguous block of 32 boundary signal segments, to produce another cumulative signal segment, and so on.

The cumulative signal segment produced by additively superimposing the predetermined number of contiguous segments of boundary signal 1300 includes an enhanced signal peak therein, which exhibits an increased signal-to-noise ratio with respect to the signal peaks in each of the constituent input boundary signal segments. The reason for this enhancement is that the superposition of the boundary signal segments aligns their respective signal peaks, so that when the segments are accumulated, each signal peak adds to the next, thus achieving a form of coherent processing gain based upon the repetitive nature of the boundary signal peaks.

Whereas the aligned, repetitive signal peaks in the boundary signal segments coherently accumulate to form an enhanced (cumulative) signal peak at the output of the additive superposition module 1400, by contrast, the random nature of the noisy conjugate products surrounding the signal peak in each of the boundary signal segments produce incoherent addition thereof during the additive superposition process. Because the signal peaks add coherently and the surrounding noisy products having zero mean add incoherently and are thus averaged, the enhanced signal peak output from the additive superposition module 1400 exhibits, overall, an improved signal-to-noise ratio. The processing gain and signal-to-noise ratio enhancement achieved by the additive superposition module increases along with the number of boundary signal segments superimposed to produce the cumulative signal segment. Offsetting this advantage is a corresponding disadvantageous increase in acquisition delay, since more boundary signal segments are collected to produce the cumulative signal peak. Thus, the particular predetermined number, for instance 16 or 32, represents in any application a balancing between these two competing interests, wherein the number of averages is ultimately limited by the fading bandwidth.

In mathematical terms, the additive superposition of contiguous segments of the conjugate products present in boundary signal 1300 can be expressed by the following:

$$F(t) = \sum_{k=0}^{K-1} D(t + k\, T_\alpha) \cdot D^*(t - T + K T_\alpha)$$

Where k is the number of superimposed segments, D is input 298 to the peak development module 1100, and K is the number of segments, such as 16, for example. An important aspect of the foregoing signal processing is that symbol timing is preserved at each stage thereof: OFDM symbols input to peak development module 1100, boundary signal segments input to additive superposition circuit 1400, and cumulative signal segments output therefrom, each have a temporal period of $T_\alpha$ (corresponding to N=1080 samples). In this way, symbol timing offset, as indicated by the positioning of the signal peaks within a signal segment, is preserved throughout.

In operation, the additive superposition module 1400, summation module 1600 and feedback delay module 1650, together provide the additive superposition functions. That is, summation module 1600 adds a present input sample to the result of an accumulation of samples in contiguous symbols, each of the samples being temporally spaced by one symbol period $T_\alpha$ (corresponding to 1080 samples). Delay 1650 imparts the one symbol period delay between accumulations. Stated otherwise, each accumulated result output by summation module 1600 is delayed by 1 symbol period $T_\alpha$, and then fed back as an input to summation module 1600, where it is added to the next input sample. The process repeats for all input samples across each input symbol.

Stated otherwise, the first cumulative sample in the cumulative signal segment represents an accumulation of all of the first samples of all of the 32 boundary signal segments. The second cumulative sample represents an accumulation of all of the second samples of all of the 32 boundary signal segments, and so on, across the cumulative signal segment.

Reset generator 1700 provides a reset signal to delay module 1650 after the predetermined number of signal segments has been accumulated to produce the cumulative signal segment. For example, if the predetermined number of boundary signal segments to be accumulated is 32, the reset generator 1700 asserts a reset to feedback delay module 1650 every 32 signal segments. Responsive to assertion of the reset, additive superposition module 1400 accumulates the next predetermined number of contiguous boundary signal segments.

As previously described, the output of additive superposition module 1400 is a cumulative signal comprising a series of cumulative signal segments, each segment including an enhanced signal peak 1550 therein. In a high-noise environment, enhanced signal peak 1550, although exhibiting an improved signal-to-noise ratio, can still be virtually indistinguishable from the surrounding noise. Thus, it is desirable to further enhance the signal-to-noise ratio of the enhanced signal peak.

To further enhance the signal-to-noise ratio of enhanced signal peak 1550, the cumulative signal output from additive superposition module 1400 is input to matched filter 1450. The temporal impulse response of matched filter 1450 is matched to the shape or amplitude envelope of the enhanced signal peak input thereto, and in one embodiment of the present invention, follows a root-raised cosine profile. Specifically, the impulse response of the matched filter corresponds to the function w(t), as shown in FIG. 11*d*, and is determined by pointwise multiplying the first αN samples of symbol 5 with the last αN samples thereof. See FIGS. 11*b* and 11*d*.

Although a non-matched low-pass filter could be used to smooth the noise present in the cumulative signal, the matched filter 1450 provides the optimum signal-to-noise improvement for the desired signal, enhanced signal peak 1550, in a Gaussian noise environment. Matched filter 1450 is implemented as a finite impulse response (FIR) digital filter that provides at an output thereof a filtered version of the complex samples input thereto.

Briefly summarizing the signal processing stages leading up to the output of the matched filter, peak development module 1100 produces a plurality of signal peaks, the temporal positions of which represent symbol boundary positions which represent symbol timing offset for each received OFDM symbol. Signal enhancing module 1350 enhances the detectability of the signal peaks by first additively superimposing a predetermined number of input signal segments to produce a cumulative signal segment having an enhanced peak therein, and then second, matched filtering the cumulative signal segment to produce a cumulative, matched-filtered signal segment that is optimally ready for subsequent peak detection processing. This process continually operates to produce a plurality of filtered enhanced signal peaks at the output of signal enhancing module 1350. The temporal positions of these filtered enhanced signal peaks within the match-filtered, cumulative signal segments output from signal enhancing module 1350, are indicative of symbol boundary positions or OFDM symbol timing offset.

Taken individually, and especially in combination, the additive superposition module and matched filter advantageously enhance signal peak detectability. Their introduction subsequent to the peak development stage permits the effective use of an OFDM signal comprising a large number of frequency carriers, and operating in a propagationally noisy signal environment.

The next stage of signal processing required to establish symbol timing offset is to detect the temporal position of the signal peak output from signal enhancing module 1350. The temporal position of the signal peak is, in actuality, the sample index, or sample number, of the enhanced signal peak within the filtered, cumulative signal segment output from the matched filter.

Filtered complex signal 1750 output from matched filter 1450 is provided as an input to peak selector module 1900, which detects the enhanced filtered signal peak and the temporal position, or sample index, thereof. In operation, squared magnitude generator 1950 of peak selector 1900 squares the magnitude of the complex signal samples input thereto to generate a signal waveform at the output thereof. The output of squared magnitude generator 1950 is provided as an input to max finder 2000 which examines the sample magnitudes input thereto and identifies the temporal position or sample index corresponding to the signal peak. This temporal position of the signal peak is provided, essentially, as the symbol timing offset that is provided by acquisition module 296 to an input of a symbol timing correction module (not shown). It should be appreciated that the temporal position provided as the timing offset $\Delta t$ may require slight adjustments to compensate for various processing delays introduced by the preceding signal processing stages. For example, initialization delays in loading filters, etc., can add delays that need to be calibrated out of the final timing offset estimate. However, such delays are generally small and implementation specific.

After the temporal position of the signal peak has been determined (to establish symbol timing offset), the next stage in signal processing is to determine the carrier phase error and corresponding carrier frequency error of the received OFDM signal. The matched-filtered, enhanced signal peak in complex signal 1750 represents the cleanest point, or point of maximum signal-to-noise ratio, at which to determine the carrier phase error and frequency error. The phase of the complex sample at this peak position gives an indication of the frequency error existing between the transmitter and receiver, since the conjugate product at this point, as developed by peak development module 1100, should have yielded a zero-phase value in the absence of carrier frequency error. The conjugate product at this point of the signal peak, and in fact at every other point in the signal peak, should yield a zero-phase value because, mathematically, the conjugate product between symbol samples having equivalent phase (as do the samples at the leading and trailing portions of each received symbol) eliminates phase, in the absence of carrier frequency error. Any residual phase present at the peak of the signal output from the matched filter is proportional to carrier frequency error, and the frequency error is simple to calculate once the residual phase is determined.

Mathematically, the carrier frequency error $\Delta f$ produces the residual phase shift of $2\pi\Delta fT$ between the samples at the leading and trailing portions of an OFDM symbol that form a conjugate product peak. Thus, the frequency error is represented by the following equation:

$$\Delta f = \frac{\text{Arg}(G_{Max})}{2\pi T}$$

where $G_{Max}$ is the peak of the matched filter output and Arg denotes the argument (phase) of a complex number—the complex sample—at the signal peak. The Arg function is equivalent to the four quadrant arctangent. Since the arctangent cannot detect angles outside of a $2\pi$ window, the frequency estimate is ambiguous up to a multiple of the channel spacing, 1/T. Nevertheless, this frequency error estimate, together with the timing offset estimate provided by the location of the signal peak, is sufficient to allow the commencement of symbol demodulation. As demodulation proceeds, subsequent receiver frame boundary processing, not part of the present invention, resolves the frequency ambiguity.

In FIG. 18, both the matched-filtered, complex signal 1750 and the temporal position or sample index, are provided as inputs to phase extractor 2050. Phase extractor 2050 extracts the residual phase from the complex sample representing the enhanced signal peak output from the matched filter. The extracted phase is provided to the input of frequency generator 2100 that simply scales the extracted phase input thereto to produce the carrier frequency error $\Delta f$ which is then provided by acquisition module 296 to a frequency correction module (not shown). Thus, the temporal position of the filtered signal peak provided at the output of matched filter 1450 is indicative of symbol timing offset, and from the phase of this signal peak, carrier frequency error is derived.

The foregoing method and apparatus for acquiring or recovering symbol timing offset and carrier frequency error from a received OFDM signal provide a basic technique for determining unqualified symbol timing offset and carrier frequency error. U.S. Pat. Nos. 6,539,063 and 6,891,898 describe additional techniques for acquiring or recovering symbol timing offset and carrier frequency error from a received OFDM signal, any of which may be used in an implementation of diversity control logic as described herein that utilizes a digital signal quality metric. Because the acquisition function as described in these patents is a time-domain process that occurs near the start of the baseband processing chain and before OFDM demodulation, it can be exploited to provide an effective digital signal quality metric.

Moreover, the predetermined amplitude and phase properties described above and inherent in the leading and trailing portions of the OFDM symbol, namely, the tapering of sample amplitudes in the leading and trailing portions of each OFDM symbol and the equivalent phases thereof, are advantageously exploited by existing IBOC systems in order to efficiently acquire OFDM symbol timing and frequency in the receiver. These properties can be used to calculate a digital signal quality metric, which can be used by diversity control logic as described herein. Thus, in one aspect, this invention utilizes these symbol characteristics to provide a diversity switching algorithm using a previously existing FM acquisition module to generate an appropriate digital signal quality metric.

Preferably, the acquisition algorithm used for the digital signal quality metric is comprised of two operations: pre-acquisition filtering and acquisition processing. Pre-acquisition filtering (FIG. 17, 1752) is used to prevent falsely acquiring on large second-adjacent channels. Each primary sideband is filtered prior to acquisition processing. In one example, the pre-acquisition filter is an 85-tap finite impulse response (FIR) filter, designed to provide 40 dB stopband rejection while limiting the impact on the desired primary sideband. Existing pre-acquisition filters can be reused, without modification. Alternatively, a time domain decimate-by-four filter can also be used, which would decrease the sample rate, peak size, and samples per symbol, as well as the MIPs of subsequent DSQM processing steps. After the input samples have been filtered, they are passed to the acquisition processing functional component.

The acquisition processing functional component takes advantage of correlation within the symbol resulting from the cycle prefix applied to each symbol by the transmitter to construct acquisition peaks. As previously described, the position of the peaks indicates the location of the true symbol boundary within the input samples, while the phase of the peaks is used to derive the frequency error. Moreover, frequency diversity can be achieved by independently processing the upper and lower primary sidebands of the digital radio signal.

Each of the symbols includes a plurality of samples. The inputs to acquisition processing are blocks of upper and lower primary sideband samples. In one example, each block is comprised of 940 real or imaginary samples, at a rate of 372,093.75 samples per second.

Figure 20:
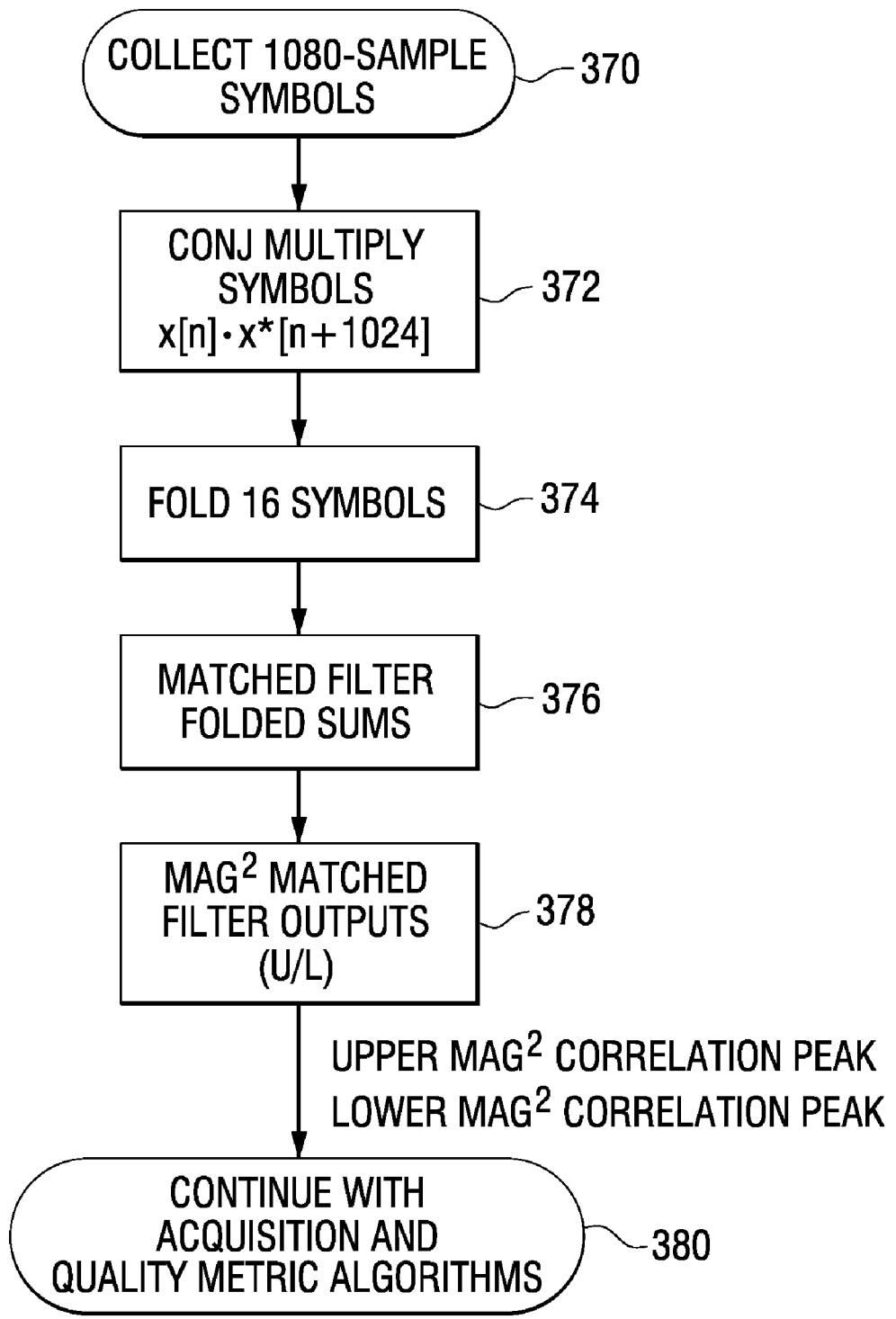
FIG. 20 is a flow diagram of a first portion of signal acquisition processing.
Figure 25:
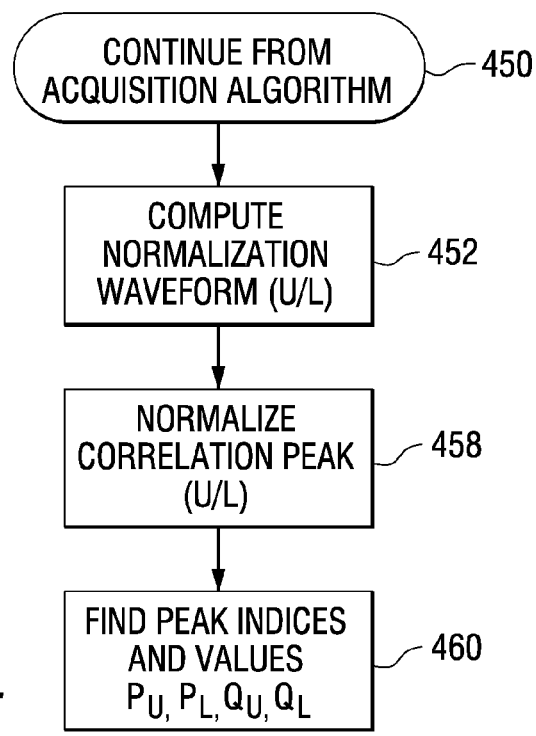
FIG. 25 is a flow diagram of a second portion of signal acquisition processing.

The acquisition algorithm as modified for calculating a digital signal quality metric is shown in FIGS. 20 and 25. Referring first to FIG. 20, 940-sample filtered data blocks are buffered into 1080-sample symbols, as shown in block 370. As previously described, the first and last 56 samples of each transmitted symbol are highly correlated due to the cyclic prefix. Acquisition processing reveals this correlation by complex-conjugate multiplying each sample in an arbitrary symbol with its predecessor 1024 samples away (block 372). To enhance the detectability of the resulting 56-sample peak, the corresponding products of 16 contiguous symbols are "folded" on top of one another to form a 1080-sample acquisition block (block 374). Sixteen symbols are used, instead of the 32 symbols as described with respect to the previously described acquisition methods, in order to expedite calculation of the of the digital signal quality metric, but fewer symbols such as 8 may be desirable and any other suitable number of symbols may be used.

The 56-sample folded peak, although visible within the acquisition block, is very noisy. Therefore, block 376 shows that it is smoothed with a 57-tap FIR filter whose impulse response is matched to the shape of the peak:

$$y[n] = \sum_{k=0}^{56} x[n+57-k]h[k] \text{ for } n = 0, 1, \ldots, 1079$$

where n is the output sample index, x is the matched-filter input, y is the matched-filtered output, and h[k] is the filter impulse response, defined below.

$$h[k] = \cos\left(-\frac{\pi}{2} + \frac{k \cdot \pi}{56}\right) \text{ for } k = 0, 1, \ldots, 56.$$

Taking the magnitude squared of the matched-filtered outputs (block 378) simplifies symbol boundary detection by converting complex values to real values. This computation increases the dynamic range of the input, making the symbol boundary peak even less ambiguous and allowing the peak search to be conducted over a single dimension (versus two dimensions for the I and Q values). The magnitude-squared calculation is:

$$y[n] = I[n]^2 + Q[n]^2 \text{ for } n = 0, 1, \ldots, 1079$$

where I is the real portion of the input, Q is the imaginary portion of the input, y is the magnitude-squared output, and n is the sample index. The upper sideband and lower sideband matched-filtered, magnitude-squared output waveforms for each 16-symbol block are used to generate the digital signal quality metric. As shown in block 380, the acquisition process continues, as described above, and the quality metric algorithm continues, as shown in FIG. 25 (block 450).

The next step in the digital signal quality metric algorithm is to calculate a normalized correlation peak (blocks 452-458) in order to achieve improved discrimination of the symbol boundary peak. Normalizing the correlation peak provides a basis for assessing the quality of the signal and indicates the probability that there is a digital signal present. The peak value of the normalized correlation peak can range from zero to one, with a value of one indicating the maximum likelihood that a digital signal is present. The peak value of the normalized correlation peak thereby provides a digital signal quality metric.

Figure 21:
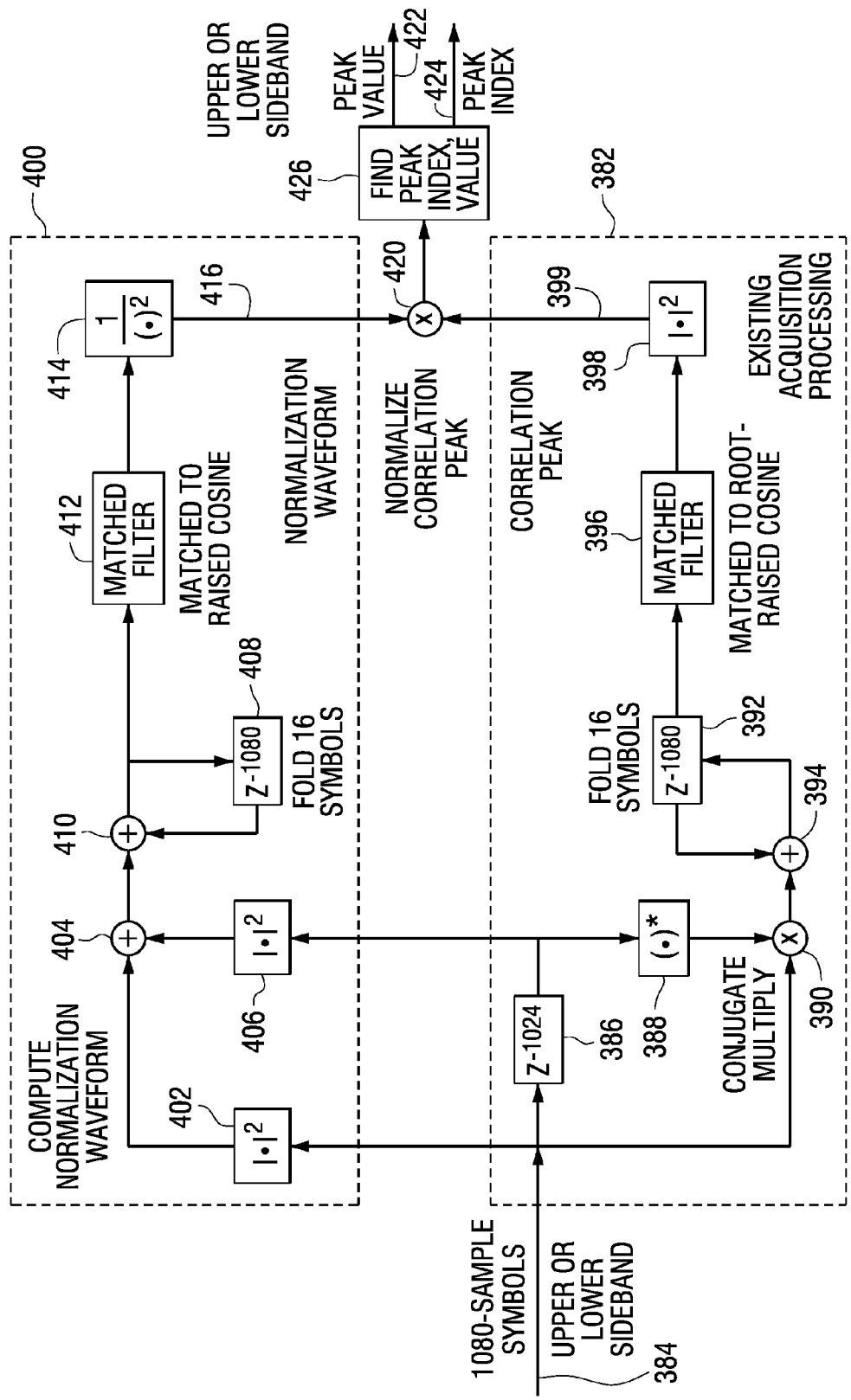
FIG. 21 is a functional block diagram that illustrates an acquisition algorithm.

Circuitry according to the existing algorithm for calculating a correlation peak is shown in box 382 of FIG. 21. The input 384 is a 1080-sample symbol received on either the upper or lower sideband. The input samples are shifted by 1024 samples 386 and the complex conjugate 388 of the shifted samples is multiplied 390 by the input samples. Sixteen symbols are folded as shown by block 392 and adder 394. The folded sums are filtered 396 by root-raised cosine matched filter and magnitude squared 398 to produce a correlation peak 399. Thus, the acquisition algorithm finds a symbol boundary by multiplying a current input sample by the complex conjugate of the input delayed by 1024 samples. At the start of a symbol, the phase of the conjugate product over the next 56 samples is effectively zero for each OFDM subcarrier. The constituent OFDM subcarriers combine coherently over this period, but not over the remainder of samples in the symbol. The result is a discernible correlation peak 399 after 16 symbols are folded and matched filtering is applied.

Figure 23:
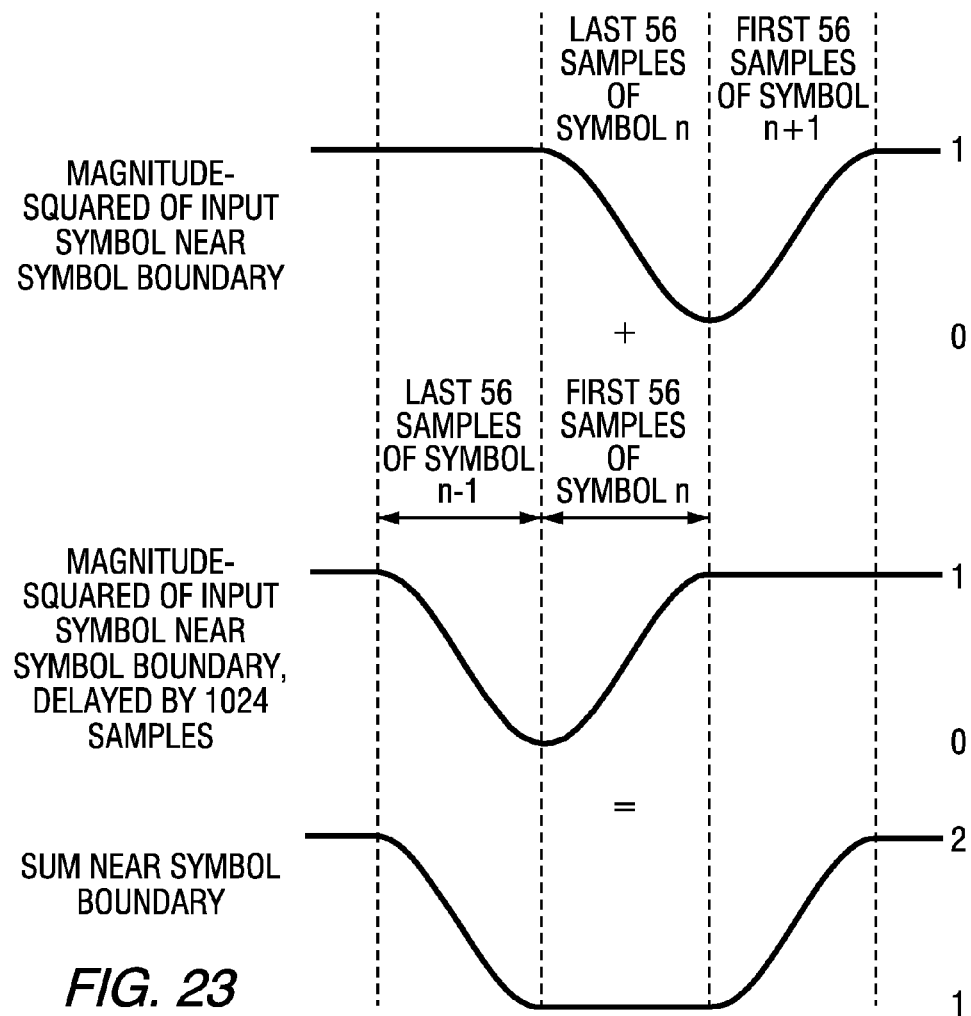
FIG. 23 is a diagram that illustrates waveform normalization near a symbol boundary.

Referring again to FIG. 25, additional processing steps according to the present invention are shown. The normalized correlation peak is determined by first calculating a normalization waveform for each of the upper and lower sideband waveforms (block 452). This normalization waveform exploits an amplitude correlation between the first and last 56 samples of an OFDM symbol due to the root-raised cosine pulse shaping applied at the transmitter. Referring to FIG. 21, block 400 illustrates the computation of the normalization waveform 416. The magnitude squared 406 of each input symbol is delayed 386 by 1024 samples and added 404 to the current magnitude-squared samples 402. Sixteen symbols are folded as shown by block 408 and adder 410. The folded sums are raised-cosine matched filtered 412, and squared and reciprocated 414 to produce a normalization waveform 416. The folding and matched filtering of the normalization waveform is identical to that performed in the existing acquisition algorithm, except the existing matched filter taps are squared and halved to ensure proper normalization:

$$g[k] = \frac{h[k]^2}{2} \text{ for } k = 0 \ldots 56$$

where k is the index of taps in the matched filters, h[k] are the existing taps for the conjugate-multiplied correlation peak, and g[k] are the new taps for the normalization waveform. After folding the first 16 symbols and matched filtering, a symbol boundary is apparent. As shown in FIG. 23, the location of the symbol boundary is marked by a reduction in amplitude of the resultant waveform.

Figure 24:
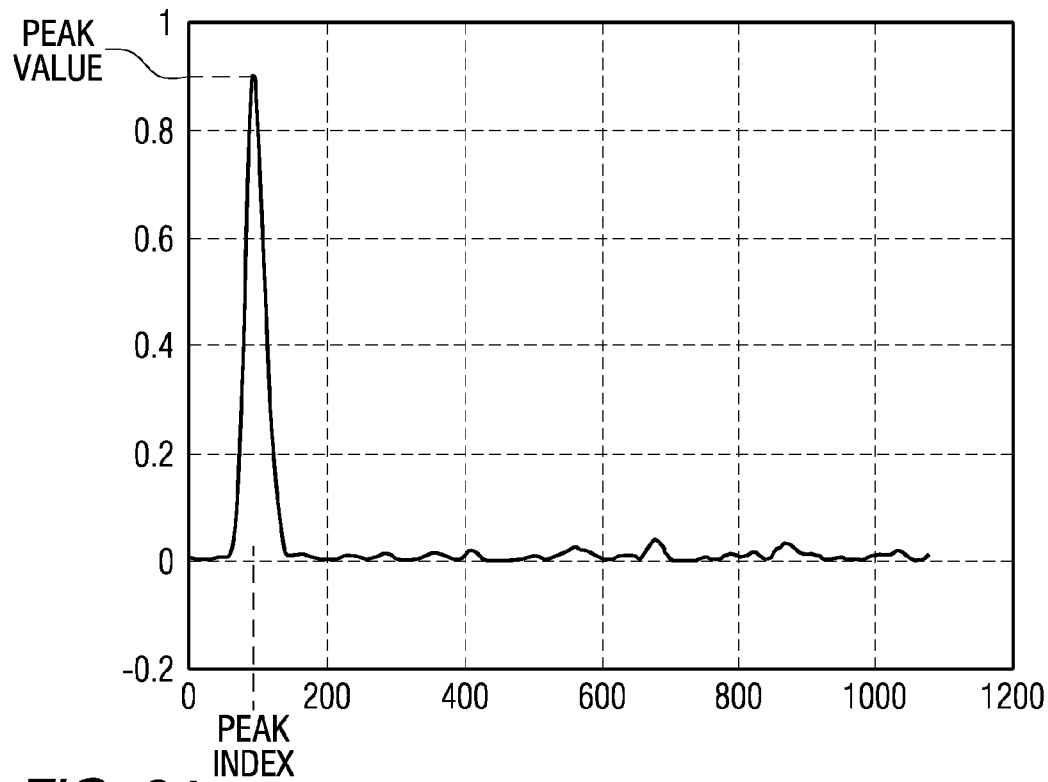
FIG. 24 is a graph of a normalized correlation peak.

Referring again to FIG. 25, once the normalization waveform is calculated, the next step is normalization of the correlation peak, block 458. Normalization of the correlation peak 399 with the normalization waveform from block 452 enhances the correlation peak by reducing the level of all samples except those coincident with the symbol boundary. Referring again to FIG. 21, the correlation peak 399 is multiplied 418 by the normalization waveform 416 to produce a normalized correlation peak 420. FIG. 24 shows an example of a normalized correlation peak in a relatively clean environment, where the x-axis represents the sample number and the y-axis is the normalized correlation value.

Once the correlation peak is normalized, the next step in the quality metric algorithm is to find peak indices $P_U$ and $P_L$ and peak values $Q_U$ and $Q_L$ (FIG. 25, block 460). The peak index is the sample number corresponding to the maximum value of the normalized correlation waveform. $P_U$ and $P_L$ are the peak indices of the normalized correlation waveform for the upper and lower sidebands, respectively. Peak value is the maximum value of the normalized correlation waveform and provides a digital signal quality metric.

A quality estimate from each sideband can be independently calculated. The peak values of the normalized correlation waveform are representative of the relative quality of that sideband:

$$Q_U = x(P_U)$$

$$Q_L = x(P_L)$$

where x is the normalized correlation waveform, $Q_U$ is the upper sideband quality, and $Q_L$ is the lower sideband quality. Referring to FIG. 21, the peak index 424 is identified and peak quality value 422 is calculated for a sideband by 426.

In order to validate the digital signal quality metric, optionally a peak index delta can be found and wrapped. The peak index delta compares the peak indices of the upper and lower sidebands for each sixteen-symbol block:

$$\Delta = |P_U - P_L|.$$

Because the symbol boundaries are modulo-1080 values, the computed deltas must be appropriately wrapped to ensure that the minimum difference is used:

If $\Delta > 540$, then $\Delta = 1080 - \Delta$.

A peak index delta of zero indicates that the peak indices from each sideband are identical, thereby representing the maximum assurance that the normalized correlation peaks from each sideband correspond to the presence of a valid digital signal.

As an additional method for validating the digital signal quality metric, optionally a frequency offset difference can be calculated for the upper and lower sidebands. According to the previously described acquisition algorithm, the phase of the complex sample at the peak position of signal 1750 gives an indication of the frequency error existing between the transmitter and receiver, since the conjugate product at this point, as developed by peak development module 1100, should have yielded a zero-phase value in the absence of carrier frequency error. The conjugate product at this point of the signal peak, and in fact at every other point in the signal peak, should yield a zero-phase value because, mathematically, the conjugate product between symbol samples having equivalent phase (as do the samples at the leading and trailing portions of each received symbol) eliminates phase, in the absence of carrier frequency error. Any residual phase present at the peak of the signal output from the matched filter is proportional to carrier frequency error, and the frequency error is simple to calculate once the residual phase is determined. The range of frequency offset measured on either sideband is ±½ FFT bin spacing, which is equivalent to ±1/(2T), for a channel spacing of 1/T, as shown in FIG. 11*a*. If the frequency offset estimated difference between the upper and lower sidebands is within a certain threshold, such as ±1/16 FFT bin spacing, for example, then it is unlikely that any adjacent interferer has the same frequency offset (as well as peak index) as the desired signal of interest. As such, the frequency offset difference indicates that the detected signal is in fact the desired signal of interest.

Figure 22:
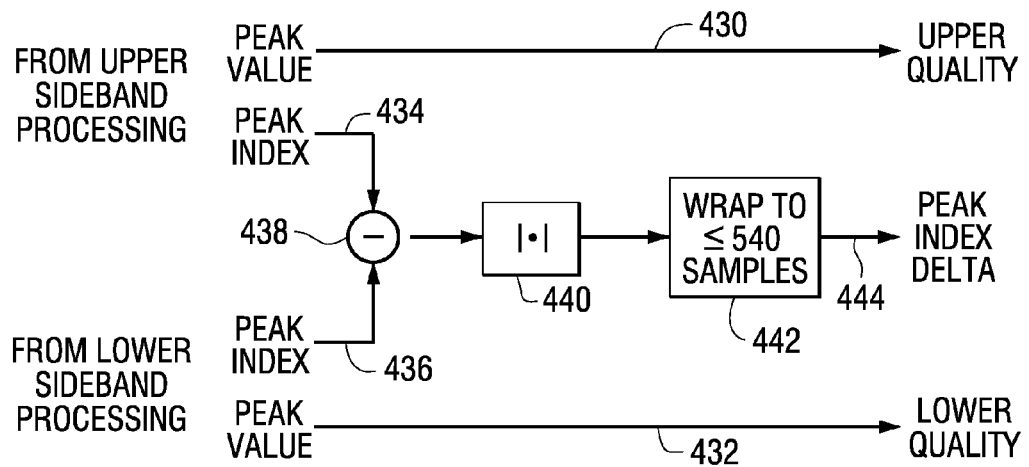
FIG. 22 is a functional block diagram showing the calibration of sideband quality estimates and peak index delta.

Referring to FIG. 22, the peak values and indices from the individual sidebands (FIG. 21, items 422 and 424) are combined to produce the peak delta and quality estimates. The peak correlation value 430 from the upper sideband signal processing is representative of the upper sideband signal quality. The peak correlation value 432 from the lower sideband signal processing is representative of the lower sideband signal quality. Optionally, the difference between the peak index 434 from the upper sideband signal processing and the peak index 436 from the lower sideband signal processing is determined by subtracting one index from the other as shown by subtraction point 438. The absolute value of the difference is determined (block 440) and the signal is wrapped to ≦540 samples (block 442) to produce a peak index delta 444. The signal is wrapped to ≦540 samples because the symbol boundary offset is modulo-½ symbol, meaning that the distance to the nearest symbol boundary is always ≦540 samples.

Once the peak index delta and quality estimates have been computed, optionally they can be compared to thresholds in order to implement appropriate decision rules. The quality for each individual sideband can be separately compared to a threshold, in addition to optionally evaluating the peak index delta and sum of the quality estimates from both sidebands. This allows for a quality assessment of a signal even when one of its sidebands has been destroyed by interference. In addition, a quality status parameter reflecting different levels of sensitivity can be used. In one example, the quality status parameter is a 2-bit value that indicates to the host controller of a digital radio receiver the quality of the currently tuned channel. In this example, the quality of the received signal increases as the status bits change from 00→11. This allows receiver manufacturers to have the ability to adjust the sensitivity of the quality algorithm by varying the threshold of the quality status bits.

The digital signal quality metric can also be used to generate a visual indication on a receiver's display of the quality of a received signal. Presently, a series of bars known as a digital audio availability indicator (DAAI) indicate the strength of a received digital signal. The status bits of the quality status parameter can be correlated to the number and size of the bars in such an indicator.

As will be appreciated from reading the above description, the simplicity of the algorithm of this invention limits the required changes to previously known receivers. The extent of the impacts on the baseband processor and host controller of the receiver are as follows.

While processing the first acquisition block, the baseband processor must now calculate the normalization waveform, as illustrated in FIG. 21. This entails computing the magnitude squared of both the current 1080-sample input symbol and a 1024-sample delayed version, adding the magnitude-squared vectors, accumulating the sum over 16 symbols, matched filtering it, and squaring the resulting vector. Besides the increase in MIPS (million instructions per second), additional memory must be allocated for the delay, accumulation, and FIR-filtering operations. Other changes include normalizing the correlation peak via vector division, finding the peak value and index of the normalized correlation peak, and computing the peak index delta. The baseband processor may then apply a decision rule and appropriately set quality status parameters based on the digital signal quality metric.

Analog Signal Quality Metric

Optionally, the diversity switching algorithm of the present invention may use an analog signal quality metric (ASQM), which gives an indication of the analog FM audio signal quality. The metric can have a value that ranges from 0 (representing no analog signal) to 1 (representing the best analog signal). The metric can be based, for example, on a signal-to-noise ratio. Preferably, the metric estimates the noise in a 2-kHz range around the 19-kHz pilot signal in the analog baseband multiplex. A phase locked loop (PLL) is commonly used to generate the 38-kHz stereo subcarrier local oscillator for stereo decoding. The PLL in this case also provides the pilot and noise signals, frequency-translated to dc. These signals are subsequently used to produce estimates of pilot noise. The noise is then warped onto a 0 to 1 range, similar to the DSQM, forming the ASQM.

Figure 26:
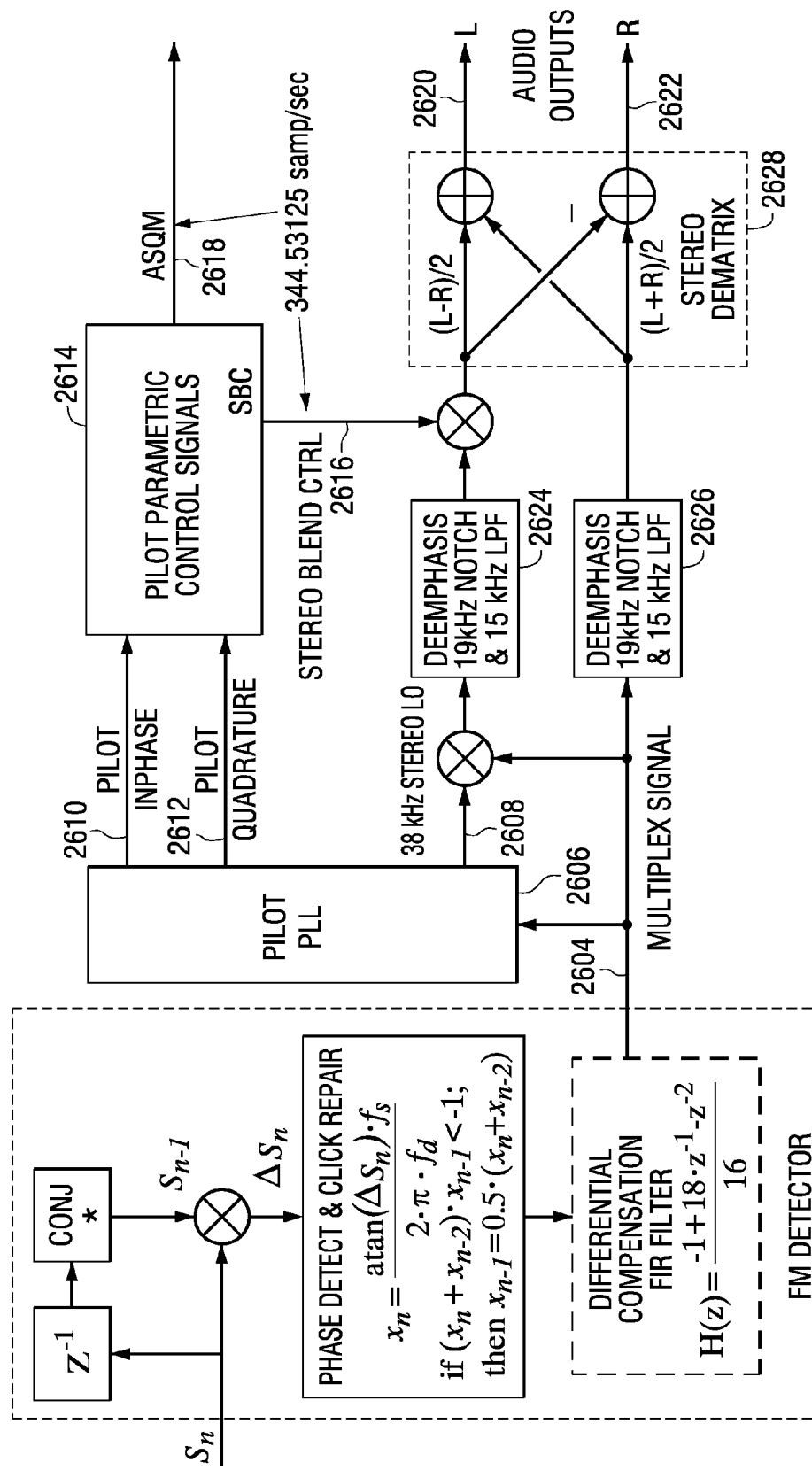
FIG. 26 is a functional diagram of an analog demodulator for an FM receiver.

FIG. 26 is a functional diagram of an FM analog demodulator according to an aspect of the present invention for generating an analog signal quality metric. An FM detector 2602 receives complex input samples S at a rate of 186,046.875 complex samples per second from an isolation filter (FIG. 17, element 1732) and outputs a baseband multiplex signal 2604. Signal 2604 is received by a pilot phase locked loop (PLL) 2606, which produces a 38-kHz stereo subcarrier local oscillator 2608, an in-phase pilot signal 2610, and a quadrature pilot signal 2612. Additional description of the pilot PLL operation can be found with respect to FIG. 27. Pilot parametric control signal generator 2614 receives the in-phase and quadrature pilot signals 2610 and 2612 and produces a stereo blend control signal 2616 and an analog signal quality metric 2618, both at output rates of 344.53125 Hz. Additional description of the generator 2614 can be found with respect to FIG. 28. The baseband multiplex signal and 38-kHz stereo subcarrier local oscillator are used to generate stereo right and left audio outputs 2620 and 2622 in a conventional manner using first and second de-emphasis, notch and low-pass filters 2624, 2626 and a stereo dematrix 2628. Stereo blend control signal 2616 is used to blend between stereo and mono depending on the received signal quality.

Figure 27:
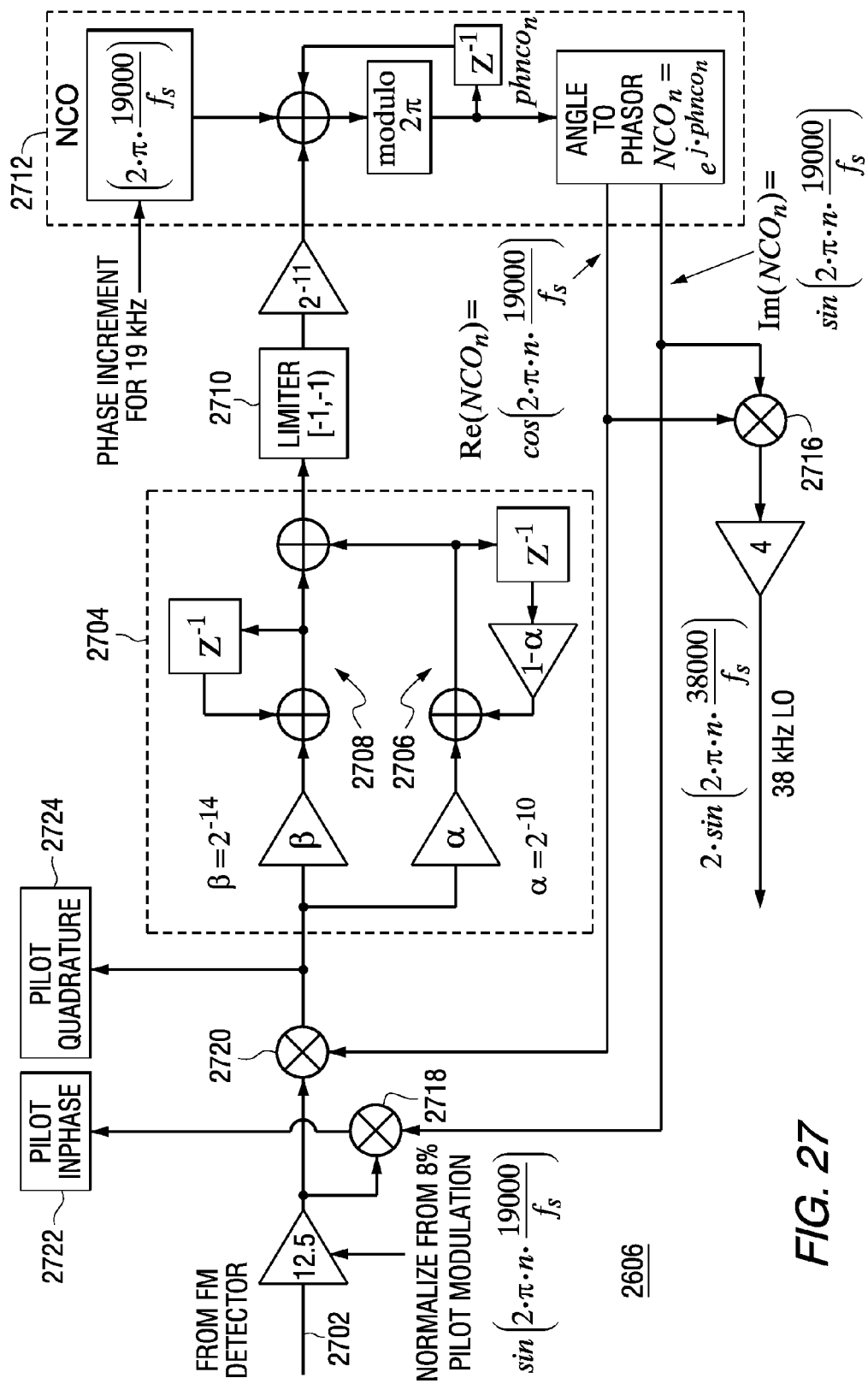
FIG. 27 is a functional diagram of a pilot phase locked loop function performed by the analog demodulator of FIG. 26.

FIG. 27 is a functional block diagram of pilot phase locked loop 2606, which receives the baseband multiplex signal and uses it to produce a 38-kHz stereo subcarrier local oscillator, an in-phase pilot component, and a quadrature pilot component. The baseband multiplex signal 2702 received from FM detector 2602 is normalized and applied to a phase locked loop with a natural frequency of 19 kHz. Loop filter 2704 applies coefficients α and β and first and second low-pass filters 2706 and 2708. Preferably, $\alpha=2^{-10}$ and $\beta=2^{14}$. The output of the loop filter is applied to limiter 2710 and numerically controlled oscillator 2712 which outputs an imaginary component:

$$\text{Im}(NCO_n) = \sin\left(2 \cdot \pi \cdot n \cdot \frac{19000}{f_s}\right)$$

and a real component in quadrature to the imaginary component:

$$\text{Re}(NCO_n) = \cos\left(2 \cdot \pi \cdot n \cdot \frac{19000}{f_s}\right).$$

The two components are multiplied 2716 to produce a 38-kHz stereo subcarrier local oscillator. The imaginary and real components are also fed back and mixed 2718, 2720 with the normalized baseband multiplex signal received from the FM detector to produce a pilot in-phase signal 2722 indicative of the level of the pilot signal and a pilot quadrature signal 2724 indicative of the level of noise around the pilot signal.

Figure 28:
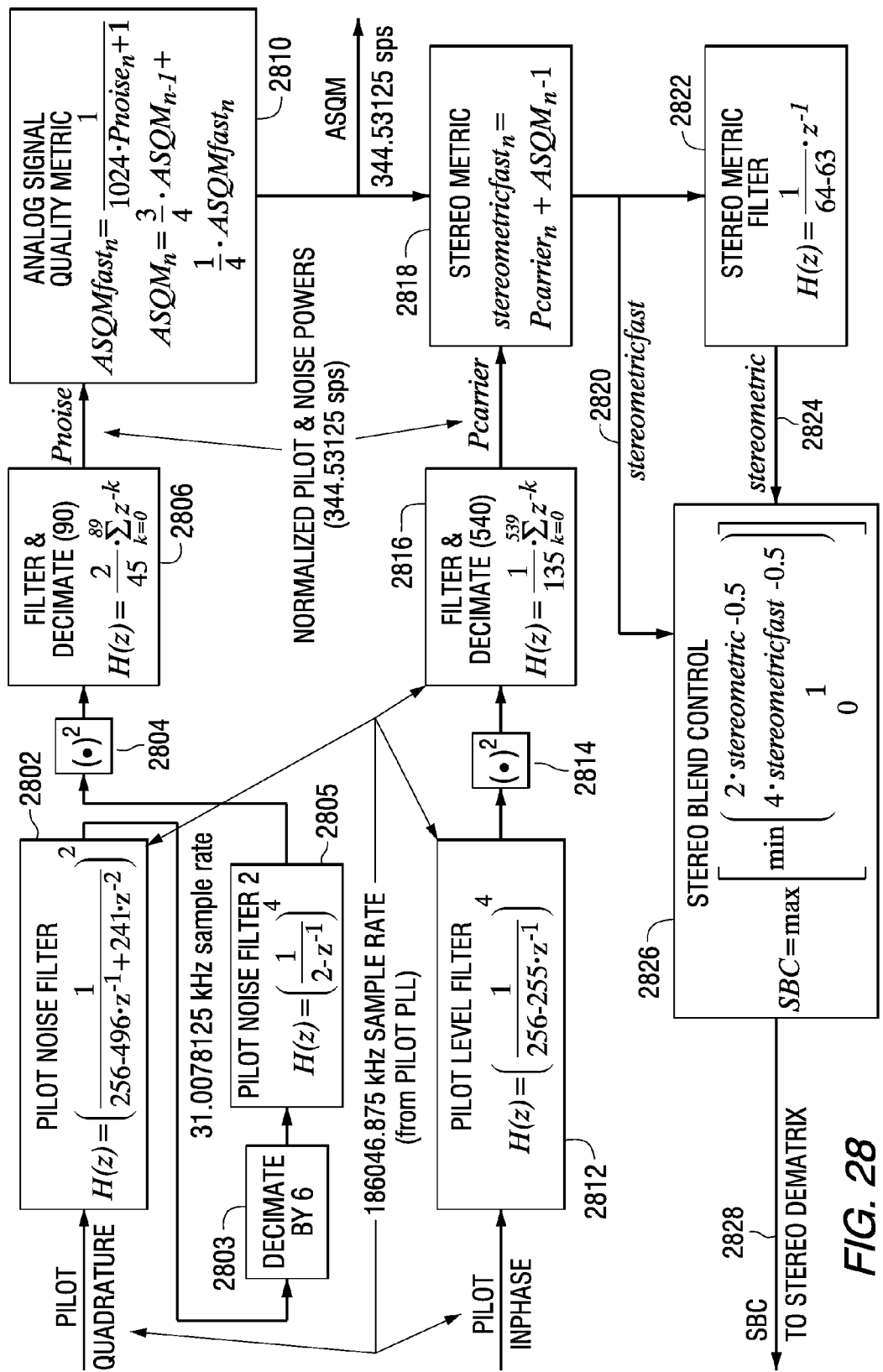
FIG. 28 is a functional diagram of the pilot parametric control signals generated by the analog demodulator of FIG. 26.

Signals 2722, 2724 are received by a pilot parametric control signal generator shown in FIG. 28. The pilot quadrature signal is passed through a first pilot noise filter 2802 characterized by the following equation:

$$H(z) = \left(\frac{1}{256 - 496 \cdot z^{-1} + 241 \cdot z^{-2}}\right)^2.$$

It is then decimated by 6, as shown in block 2803, and filtered by pilot noise filter 2 (block 2805) per:

$$H(z) = \left(\frac{1}{2 - z^{-1}}\right)^4.$$

The resulting output is magnitude squared (2804) and applied to a smoothing filter and decimator 2806 characterized by the following equation:

$$H(z) = \frac{2}{41} \cdot \sum_{k=0}^{89} z^{-k}.$$

The output represents a normalized noise power estimate output at a rate of 344.53125 Hz. The normalized noise power is then subject to the following filtering calculations (2810):

$$ASQMfast_n = \frac{1}{1024 \cdot Pnoise_n + 1}$$

$$ASQM_n = \frac{3}{4} \cdot ASQM_{n-1} + \frac{1}{4} \cdot ASQMfast_n$$

wherein $ASQMfast_n$ warps the noise power to a range from 0 to 1, which is then subject to a smoothing function via a lowpass filter to produce the analog signal quality metric, $ASQM_n$.

The pilot in-phase signal, which corresponds to the DC component of the pilot signal, is passed through filter 2812 characterized by the following equation:

$$H(z) = \left(\frac{1}{256 - 255 \cdot z^{-1}}\right)^4.$$

The output is magnitude squared (2814) and applied to a smoothing filter and decimator 2816 characterized by the following equation:

$$H(z) = \frac{1}{135} \cdot \sum_{k=0}^{539} z^{-k}.$$

After limiting to unitary value, the output represents the normalized pilot carrier power at an output rate of 344.53125 Hz.

The normalized pilot carrier power and $ASQM_n$ are used to create a fast stereo metric 2820 according to the equation (2818):

$$stereometricfast_n = Pcarrier_n + ASQM_n - 1.$$

The fast stereo metric is then smoothed by a filter 2822 characterized by the following equation to generate a stereo metric signal 2824:

$$H(z) = \frac{1}{64 - 63 \cdot z^{-1}}.$$

This stereo metric and fast stereo metric are then used to generate a stereo blend control signal 2828 according to the following equation (2826):

$$SBC = \max\left[\min\begin{pmatrix} 2\cdot stereometric - 0.5 \\ 4\cdot stereometricfast - 0.5 \\ 1 \\ 0 \end{pmatrix}\right].$$

Both the normal and fast stereo metric signals are used to provide smooth and less annoying blending (normal) as the signal gradually weakens, and have the ability to quickly suppress short bursts of signal degradation, as often occurs in FM reception, known as the threshold effect.

This invention provides methods and apparatus for providing improved reception of analog and digital signals by an FM radio receiver. The receiver can be hand-held, portable, tabletop, automotive, or any other type of FM radio receiver. Moreover, the invention can be used to improve the reception of other types of devices that receive radio signals, such as cellphones, for example. The methods described herein may be implemented utilizing either a software-programmable digital signal processor, or a programmable/hardwired logic device, or any other combination of hardware and software sufficient to carry out the described functionality.

While the present invention has been described in terms of its preferred embodiment, it will be understood by those skilled in the art that various modifications can be made to the disclosed embodiment without departing from the scope of the invention as set forth in the claims.

What is claimed is:

1. A method for receiving a radio signal, the method comprising the steps of:
    receiving the radio signal on at least one of a first antenna and a second antenna;
    calculating a first quality metric for the received radio signal;
    selecting the first antenna, the second antenna or a combination of the first and second antennas to receive the radio signal, based on the first quality metric; and
    dynamically tuning an impedance of the selected antenna in response to an adaptive impedance matching control signal to match the impedance of a receiver.

2. The method of claim 1, wherein the first quality metric comprises a digital signal quality metric.

3. The method of claim 1, wherein the first quality metric comprises an analog signal quality metric.

4. The method of claim 1, wherein at least one of the first and second antennas comprises an end-fed sleeve dipole.

5. The method of claim 1, wherein at least one of the first and second antennas comprises a loop antenna.

6. The method of claim 1, wherein the radio signal is a digital radio broadcast signal.

7. The method of claim 1, wherein the radio signal is an in-band on-channel digital radio broadcast signal including an analog modulated signal and a digitally modulated signal, and first quality metric is a digital signal quality metric; the method further comprising:
    calculating an analog signal quality metric, wherein selecting the first antenna, the second antenna or a combination of the first and second antennas to receive the radio signal, based on the metric and the analog signal quality metric.

8. The method of claim 1, further comprising the steps of:
    calculating a second quality metric for the received radio signal; and
    dwelling on the selected antenna until at least one of the first and second quality metrics fails to meet a predetermined dynamic criteria.

9. The method of claim 8, further comprising the step of:
    selecting a predetermined one of the first and second antennas when at least one of the first and second quality metrics fails to meet a predetermined dynamic criteria.

10. The method of claim 1, wherein the tuning step uses a voltage controlled matching circuit.

11. The method of claim 1, wherein the tuning step selects from a set of impedance values.

12. The method of claim 1, wherein the radio signal is an in-band on-channel digital radio broadcast signal including an analog modulated signal and a digitally modulated signal in upper and lower sidebands, the method further comprising:
    canceling interference from a first-adjacent signal in the upper and lower sidebands prior to calculating a first quality metric.

13. The method of claim 1, wherein the radio signal is an in-band on-channel digital radio broadcast signal including an analog modulated signal and a digitally modulated signal in upper and lower sidebands, the method further comprising:
    filtering the upper and lower sidebands prior to the step of calculating a first quality metric.

14. The method of claim 1, wherein the radio signal is an in-band on-channel digital radio broadcast signal including an analog modulated signal and a digitally modulated signal in upper and lower sidebands, and the step of calculating a first quality metric calculates a quality estimate for the upper and lower sideband independently.

15. The method of claim 14, wherein the quality estimates for the upper and lower sidebands are separately compared to a threshold.

16. The method of claim 14, wherein the quality estimates for the upper and lower sidebands comprise peak indices and peak values of a normalized correlation waveform.

17. An apparatus for receiving a radio signal, the apparatus comprising:
    a first antenna;
    a second antenna;
    a processor for calculating a first quality metric for the received radio signal;
    an antenna selector for selecting the first antenna, the second antenna or a combination of the first and second antennas to receive the radio signal, based on the first quality, metric; and
    an impedance matching circuit for dynamically tuning an impedance of the selected antenna in response to an adaptive impedance matching control signal to match the impedance of a receiver.

18. The apparatus of claim 17, wherein the first quality metric comprises a digital signal quality metric.

19. The apparatus of claim 17, wherein the first quality metric comprises an analog signal quality metric.

20. The apparatus of claim 17, wherein at least one of the first and second antennas comprises an end-fed sleeve dipole.

21. The apparatus of claim 17, wherein at least one of the first and second antennas comprises a loop antenna.

22. The apparatus of claim 17, wherein the radio signal is a digital radio broadcast signal.

23. The apparatus of claim 17, wherein the radio signal is an in-band on-channel digital radio broadcast signal including an analog modulated signal and a digitally modulated signal, and first quality metric is a digital signal quality metric, and wherein the processor calculates an analog signal quality metric, and the antenna selector selects the first antenna, the second antenna or a combination of the first and second antennas to receive the radio signal, based on the digital signal quality metric and the analog signal quality metric.

24. The apparatus of claim 17, wherein the processor calculates a second quality metric for the received radio signal, and the antenna selector dwells on the selected antenna until at least one of the first and second quality metrics fails to meet a predetermined dynamic criteria.

25. The apparatus of claim 24, wherein the antenna selector selects a predetermined one of the first and second antennas when at least one of the first and second quality metrics fails to meet a predetermined dynamic criteria.

26. The apparatus of claim 17, wherein the impedance matching circuit uses a voltage controlled matching circuit.

27. The apparatus of claim 17, wherein the impedance matching circuit selects from a set of impedance values.

28. The apparatus of claim 17, wherein the radio signal is an in-band on-channel digital radio broadcast signal including an analog modulated signal and a digitally modulated signal in upper and lower sidebands, and the processor cancels interference from a first-adjacent signal in the upper and lower sidebands prior to calculating a first quality metric.

29. The apparatus of claim 17, wherein the radio signal is an in-band on-channel digital radio broadcast signal including an analog modulated signal and a digitally modulated signal in upper and lower sidebands, the processor filters the upper and lower sidebands prior to the step of calculating a first quality metric.

30. The apparatus of claim 17, wherein the radio signal is an in-band on-channel digital radio broadcast signal including an analog modulated signal and a digitally modulated signal in upper and lower sidebands, and the processor calculates a quality estimate for the upper and lower sideband independently.

31. The apparatus of claim 30, wherein the quality estimates for the upper and lower sidebands are separately compared to a threshold.

32. The apparatus of claim 30, wherein the quality estimates for the upper and lower sidebands comprise peak indices and peak values of a normalized correlation waveform.

* * * * *

UNITED STATES PATENT AND TRADEMARK OFFICE
CERTIFICATE OF CORRECTION

| | | |
|---|---|---|
| PATENT NO. | : 7,982,683 B2 | Page 1 of 1 |
| APPLICATION NO. | : 11/861479 | |
| DATED | : July 19, 2011 | |
| INVENTOR(S) | : Paul J. Peyla and Brian W. Kroeger | |

It is certified that error appears in the above-identified patent and that said Letters Patent is hereby corrected as shown below:

Column 2, Line 17
"www.ibiguity.com" should read "www.ibiquity.com"

Column 11, Line 31
"(NPSD)" should read "(MPSD)"

Column 13, Line 65
"1°F" should read "1µF"

Column 21, Line 10
"Where" should read "where"

Claim 7
Column 31, Line 60
"...signal, based on the metric..." should read "...signal, based on the digital signal quality metric..."

Signed and Sealed this

Eleventh Day of September, 2012

David J. Kappos
*Director of the United States Patent and Trademark Office*